US008713946B2

(12) United States Patent
Botarelli

(10) Patent No.: US 8,713,946 B2
(45) Date of Patent: May 6, 2014

(54) EXHAUST TEMPERATURE BASED THRESHOLD FOR CONTROL METHOD AND TURBINE

(75) Inventor: Claudio Botarelli, Arezzo (IT)

(73) Assignee: Nuovo Pignone S.p.A., Florence (IT)

( * ) Notice: Subject to any disclaimer, the term of this patent is extended or adjusted under 35 U.S.C. 154(b) by 90 days.

(21) Appl. No.: 13/512,120

(22) PCT Filed: Nov. 26, 2010

(86) PCT No.: PCT/EP2010/068334
§ 371 (c)(1),
(2), (4) Date: Jul. 25, 2012

(87) PCT Pub. No.: WO2011/064343
PCT Pub. Date: Jun. 3, 2011

(65) Prior Publication Data
US 2012/0279230 A1    Nov. 8, 2012

(30) Foreign Application Priority Data

Nov. 27, 2009    (IT) .............................. CO2009A0055

(51) Int. Cl.
*F02C 1/00* (2006.01)
(52) U.S. Cl.
USPC .......................................... 60/772; 60/39.23
(58) Field of Classification Search
CPC ................ F23R 3/26; F02C 9/16; F02C 9/26; F02C 9/28; F02C 9/34
USPC .................. 60/39.23, 39.24, 39.281, 772, 773
See application file for complete search history.

(56) References Cited

U.S. PATENT DOCUMENTS

| 5,584,171 | A | 12/1996 | Sato et al. |
| 6,092,362 | A | 7/2000 | Nagafuchi et al. |
| 6,338,240 | B1 | 1/2002 | Endo et al. |
| 6,805,483 | B2 | 10/2004 | Tomlinson et al. |
| 7,076,940 | B2 * | 7/2006 | Hirayama et al. ........... 60/39.27 |
| 7,549,292 | B2 * | 6/2009 | Peck et al. ....................... 60/773 |
| 2002/0106001 | A1 | 8/2002 | Tomlinson et al. |
| 2004/0076218 | A1 | 4/2004 | Tomlinson et al. |

(Continued)

FOREIGN PATENT DOCUMENTS

| EP | 1 860 302 A1 | 11/2007 |
| EP | 2 085 577 A1 | 8/2009 |

OTHER PUBLICATIONS

Basu; Gradassi and Sills: "Use of DME as a Gas Turbine Fuel", Upstream Technology Group, BP Exploration Theo Fleisch and Raj Pun: Gas & Power, PC Exploration. Presented at the ASME Turbo-Expo, New Orleans, Jun. 2001.

(Continued)

*Primary Examiner* — Phutthiwat Wongwian
(74) *Attorney, Agent, or Firm* — Global Patent Operation

(57) ABSTRACT

Gas turbine and method for controlling an operating point of the gas turbine that includes a compressor, a combustor and at least a turbine. The method includes calculating an exhaust temperature reference curve of the turbine as a function of a turbine pressure ratio; determining whether condition $IGV_{min}+\Delta IGV_1 \leq IGV_{set\,point} \leq IGV_{max}+\Delta IGV_2$, and condition $ttx \geq ttxh+\Delta ttx_3$, are true; and changing, if both conditions are true, a split fuel quantity from a first value to a second value or otherwise maintaining the first value, the first value characterizing a lean-lean steady state mode and the second value characterizing a premixed secondary mode of a premixed mode.

13 Claims, 18 Drawing Sheets

(56) References Cited

U.S. PATENT DOCUMENTS

| | | |
|---|---|---|
| 2004/0107702 A1 | 6/2004 | Nichols et al. |
| 2007/0245745 A1 | 10/2007 | Davies et al. |
| 2007/0271024 A1* | 11/2007 | Fujii et al. .................... 701/100 |
| 2008/0243352 A1 | 10/2008 | Healy |
| 2011/0037276 A1* | 2/2011 | Hoffmann et al. .............. 290/40 |

OTHER PUBLICATIONS

Italian Search Report and Written Opinion dated Jul. 26, 2010 which was issued in connection with Italian Patent Application No. CO2009A000055 which was filed on Nov. 27, 2009.

International Search Report and Written Opinion which was dated Mar. 16, 2011 which was issued in connection with the PCT Patent Application No. EP10/068334 which was filed on Nov. 26, 2010.

* cited by examiner

EXHAUST TEMPERATURE BASED THRESHOLD FOR CONTROL METHOD AND TURBINE

CROSS REFERENCE TO RELATED APPLICATIONS

This is a national stage application under 35 U.S.C. §371 (c) of prior-filed, co-pending PCT patent application Ser. No. PCT/EP2010/068334, filed on Nov. 26, 2010, which claims priority to Italian Patent Application Ser. No. CO2009A000055, filed on Nov. 27, 2009, the entire contents of which are incorporated herein by reference.

BACKGROUND OF THE INVENTION

1. Field of the Invention

Embodiments of the subject matter disclosed herein generally relate to methods and systems and, more particularly, to mechanisms and techniques for controlling a gas turbine.

2. Description of the Related Art

Turbomachinery used, for example, in power plants or jet engines, are continuously evolving based on new discoveries and better materials. In addition, the manufacturers of these machines are under increased pressure to produce or improve the machines to be "greener," i.e., to reduce the amount of pollution produced while operating.

Thus, there is ongoing research for lowering the exhaust emissions of turbo machineries especially considering the desire to use a wide range of gaseous fuels. Meeting these requirements becomes more and more difficult, particularly when considering the wide range of operation of these devices. An accurate turbomachine exhaust temperature control becomes, under these conditions, a relevant factor in order to develop successful applications.

One approach for lowering the pollution produced by a turbomachine is based on a paradigm of exhaust temperature versus compressor pressure ratio. In this regard, U.S. Patent Application Publication 2008/0243352, the entire content of which is included here by reference, describes that current control systems may execute scheduling algorithms that adjust the fuel flow, inlet guide vanes (IGV), and other control inputs to provide safe and efficient operation of a gas turbine. Gas turbine control systems may receive as inputs operating parameters and settings that, in conjunction with scheduling algorithms, determine turbine control settings to achieve the desired operation. Measured operating parameters may include compressor inlet pressure and temperature, compressor exit pressure and temperature, turbine exhaust temperature, and generator power output. Desired operating settings may include generator power output and exhaust energy. The schedules (e.g., exhaust temperature vs. compressor pressure ratio, fuel splits vs. combustion reference temperature, inlet bleed heat (IBH) vs. IGV, compressor operating limit line vs. corrected speed and inlet guide vane, etc.) are defined to protect the turbine against known operational boundaries (e.g., emissions, dynamics, lean-blow-out, compressor surge, compressor icing, compressor clearances, aero-mechanical, etc.) based on off-line field tests or laboratory data. The output of the schedules then determines the appropriate adjustment of the control system inputs. Typical control inputs managed by a control system may include fuel flow, combustor fuel distribution (which may be referred to as "fuel splits"), compressor inlet guide vane position, and inlet bleed heat flow.

FIG. 1, which is similar to FIG. 1 of U.S. Patent Application Publication 2008/0243352, illustrates an example of a gas turbine 10 having a compressor 12, a combustor 14, a turbine 16 coupled to the compressor 12, and a computer control system (controller) 18. An inlet duct 20 to the compressor 12 may feed ambient air to compressor 12. The inlet duct 20 may have ducts, filters, screens and noise abatement devices that contribute to a pressure loss of ambient air flowing through the inlet 20 and into inlet guide vanes 21 of the compressor 12. An exhaust duct 22 for the turbine directs combustion gases from the outlet of the turbine 10 through, for example, emission control and noise abatement devices. The amount of inlet pressure loss and back pressure may vary over time due to the addition of components and due to dust and dirt clogging the inlet 20 and exhaust ducts 22. The turbine 10 may drive a generator 24 that produces electrical power.

As described in U.S. Patent Application Publication 2008/0243352, the operation of the gas turbine 10 may be monitored by several sensors 26 designed to measure different performance-related variables of the turbine 10, the generator and the ambient environment. For example, groups of redundant temperature sensors 26 may monitor ambient temperature surrounding the gas turbine 10, compressor discharge temperature, turbine exhaust gas temperature, and other temperature measurements of the gas stream through the gas turbine 10. Similarly, groups of redundant pressure sensors 26 may monitor ambient pressure, and static and dynamic pressure levels at the compressor inlet and outlet turbine exhaust, at other locations in the gas stream through the gas turbine 10. Groups of redundant humidity sensors 26, for example, wet and dry bulb thermometers, may measure ambient humidity in the inlet duct of the compressor 12. Groups of redundant sensors 26 may also include flow sensors, speed sensors, flame detector sensors, valve position sensors, guide vane angle sensors, or the like, that sense various parameters pertinent to the operation of gas turbine 10. As used herein, "parameters" refer to items that can be used to define the operating conditions of the turbine, such as but not limited to temperatures, pressures, and gas flows at defined locations in the turbine.

Also described in U.S. Patent Application Publication 2008/0243352A, the fuel control system 28 regulates the fuel flowing from a fuel supply to the combustor 14, one or more splits between the fuel flowing into primary and secondary fuel nozzles, and the amount of fuel mixed with secondary air flowing into a combustion chamber. The fuel control system 28 may also select the type of fuel for the combustor. The fuel control system 28 may be a separate unit or may be a component of the main controller 18. The controller 18 may be a computer system having at least one processor that executes programs and operations to control the operation of the gas turbine using sensor inputs and instructions from human operators. The programs and operations executed by the controller 18 may include, among others, sensing or modeling operating parameters, modeling operational boundaries, applying operational boundary models, applying scheduling algorithms, and applying boundary control logic to close loop on boundaries. The commands generated by the controller 18 may cause actuators on the gas turbine to, for example, adjust valves (actuator 27) between the fuel supply and combustors that regulate the flow, fuel splits and type of fuel flowing to the combustors; adjust inlet guide vanes 21 (actuator 29) on the compressor; adjust inlet bleed heat; as well as activate other control settings on the gas turbine.

U.S. Patent Application Nos. 2002/0106001 and 2004/0076218, the entire contents of which are incorporated here by reference, describe a method and system for adjusting turbine control algorithms to provide accurate calculation of a firing temperature and combustion reference temperature of a gas turbine as the water vapor content in a working fluid varies substantially from a design value. These references disclose using turbine temperature exhaust and turbine pressure ratio for controlling the firing temperature.

However, the traditional methods and systems are limited in their capability of controlling the gas turbine and accordingly, it would be desirable to provide systems and methods that obtain a more accurate firing temperature control, and/or a more accurate combustion parameters control, and/or a more accurate exhaust emissions control.

BRIEF SUMMARY OF THE INVENTION

According to an exemplary embodiment, a method for controlling an operating point of a gas turbine that includes a compressor, a combustor and at least a turbine is provided. The method comprises determining an exhaust pressure drop at an exhaust of the turbine; measuring a compressor pressure discharge at the compressor; determining a turbine pressure ratio based on the exhaust pressure drop and the compressor pressure discharge; calculating an exhaust temperature reference curve of the turbine as a function of the turbine pressure ratio; determining whether both conditions (1) and (2) are true, wherein condition (1) is $IGV_{min}+\Delta IGV_1 \leq IGV_{set\ point} \leq IGV_{max}+\Delta IGV_2$, and condition (2) is $ttx \geq ttxh + \Delta ttx_3$, with $IGV_{set\ point}$ being a target angle of inlet guide vanes (IGV) to be provided at an inlet of the compressor, $IGV_{min}$ is a minimum value for the IGV, $IGV_{max}$ is a maximum value for the IGV, $\Delta IGV_1$ is a first predetermined positive IGV angle increase for lean-lean to premixed transfer, $\Delta IGV_2$ is a second predetermined positive IGV angle increase for lean-lean to premixed transfer, ttx is a current exhaust temperature, ttxh is the exhaust temperature reference curve, and $\Delta ttx_3$ is a predetermined negative temperature characterizing an exhaust temperature dead band for lean-lean to premixed transfer; and changing, if both conditions (1) and (2) are true, a split fuel quantity from a first value to a second value or otherwise maintaining the first value, the first value characterizing a lean-lean steady state mode and the second value characterizing a premixed secondary mode of a premixed mode wherein the premixed mode and the lean-lean mode are defined as follows. The premixed mode is defined as providing fuel to primary burners an dto a second burner of the combustor and igniting the provided fuel in a secondary region of the combustor while primary regions are free of flames, the primary regions being adjacent to the secondary region. The lean-lean mode is defined as providing fuel to both the primary burners and the secondary burner and igniting the provided fuel both in the primary regions and the secondary regions. The split fuel quantity describes in percentages the first amount of the total fuel that is received by the primary burners and a second amount of the total fuel that is received by the secondary burner.

According to another exemplary embodiment, a controller for controlling an operating point of a gas turbine that includes a compressor, a combustor and at least a turbine is provided. The controller comprises a pressure sensor configured to measure a compressor pressure discharge at the compressor and a processor connected to the pressure sensor. The processor is configured to determine an exhaust pressure drop at an exhaust of the turbine, determine a turbine pressure ratio based on the exhaust pressure drop and the compressor pressure discharge, calculate an exhaust temperature reference curve of the turbine as a function of the turbine pressure ratio, determine whether both conditions (1) and (2) are true, wherein condition (1) is $IGV_{min}+\Delta IGV_1 \leq IGV_{set\ point} \leq IGV_{max}+\Delta IGV_2$, and condition (2) is $ttx \geq ttxh + \Delta ttx_3$, with $IGV_{set\ point}$ being a target angle of inlet guide vanes (IGV) to be provided at an inlet of the compressor, $IGV_{min}$ is a minimum value for the IGV, $IGV_{max}$ is a maximum value for the IGV, $\Delta IGV_1$ is a first predetermined IGV angle increase for lean-lean to premixed transfer, $\Delta IGV_2$ is a second predetermined negative IGV angle increase for lean-lean to premixed transfer, ttx is a current exhaust temperature, ttxh is the exhaust temperature reference curve, and $\Delta ttx_3$ is a predetermined negative temperature characterizing an exhaust temperature band for lean-lean to premixed transfer during which no action is taken, and change, if both conditions (1) and (2) are true, a split fuel quantity from a first value to a second value or otherwise maintaining the first value, the first value characterizing a lean-lean steady state mode and the second value characterizing a premixed secondary mode of a premixed mode.

BRIEF DESCRIPTION OF THE DRAWINGS

The accompanying drawings, which are incorporated in and constitute a part of the specification, illustrate embodiments of the present invention and, together with the description, explain these embodiments. In the drawings.

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a single shaft gas turbine system. However, the embodiments to be discussed next are not limited to these systems, but may be applied to other systems, for example multiple shaft gas turbines.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Furthermore, the particular features, structures or characteristics may be combined in any suitable manner in one or more embodiments.

Figure 1:
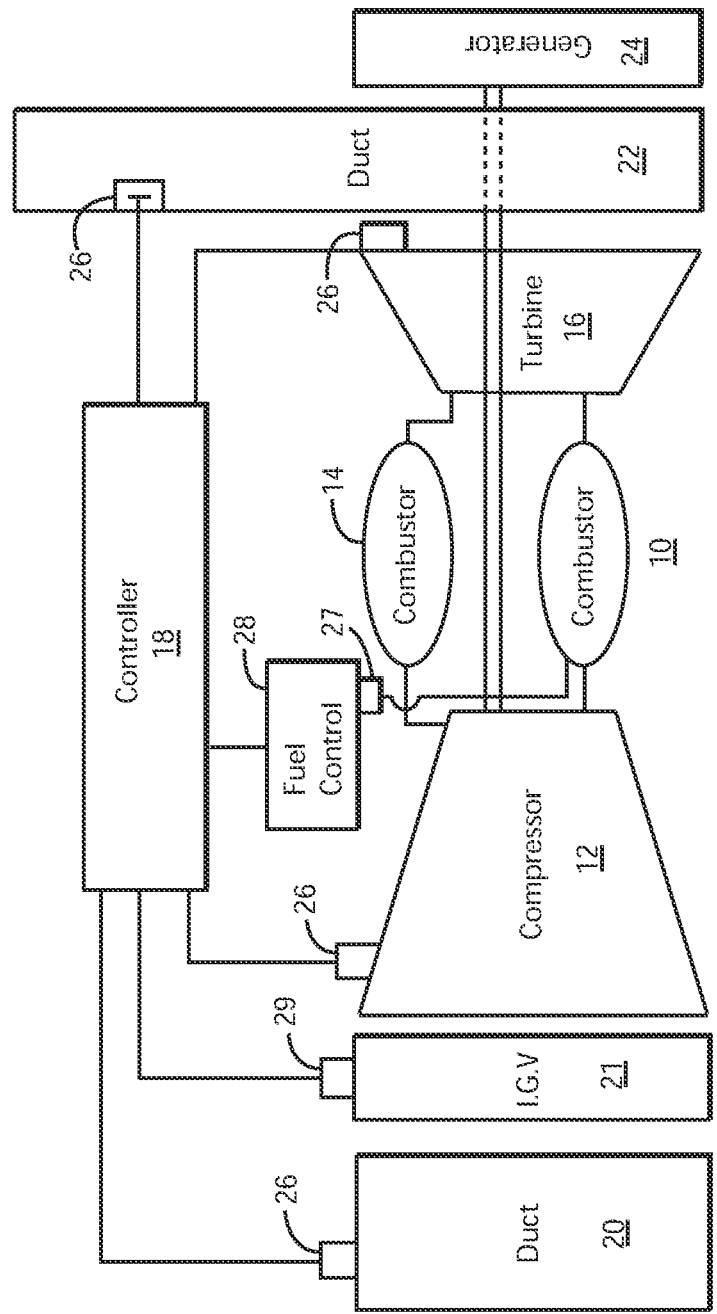
FIG. 1 is a schematic diagram of a conventional gas turbine.

As discussed above with regard to FIG. 1, various parameters of the turbine 10 may be measured and/or calculated for determining a desired quantity to be monitored. Such a quantity is the firing temperature of the turbine. By maintaining the firing temperature of the turbine within an optimum range, the operation of the turbine is considered to be smooth and under control. When the firing temperature of the turbine exits the optimum range, the controller 18 is configured to change, for example, the compressor's air flow rate and thus, a compressor pressure ratio, for adjusting the firing temperature. Events that may determine the firing temperature to exit the optimum range is, for example, a change in a load of the gas turbine or a gas fuel composition change.

However, the novel embodiments to be discussed next do not rely on the traditional paradigms for controlling the gas turbine but rather rely on a novel paradigm, e.g., controlling a turbine temperature exhaust based on a turbine pressure ratio. This novel paradigm offers a more accurate estimation of the state of the gas turbine and is also more sensitive to changes occurring in the functioning of the gas turbine, e.g., load change.

Figure 2:
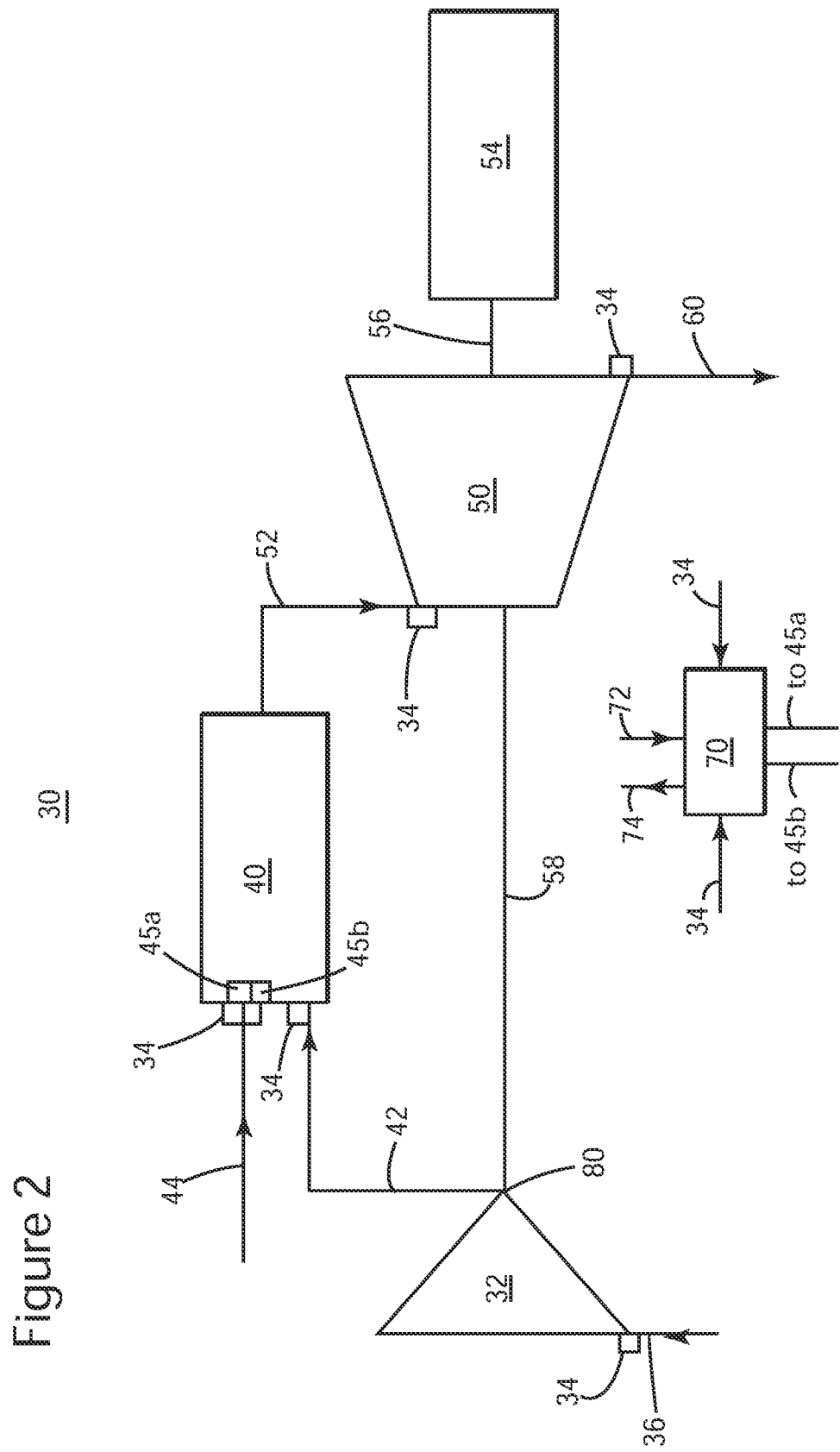
FIG. 2 is a schematic diagram of a gas turbine considered in an embodiment of the subject matter disclosed.

According to an exemplary embodiment, an exhaust temperature is determined as a function of the turbine pressure ratio and the exhaust temperature is monitored and maintained within certain boundaries for ensuring an efficient operation of the gas turbine, e.g., accommodating base load, low load, high load, etc. More details about determining the exhaust temperature and the turbine pressure ratio are discussed next with regard to FIG. 2. FIG. 2 shows a gas turbine 30 having a compressor 32 configured to receive a fluid (e.g., air) through an inlet duct 36. Sensors 34 may be disposed at inlet duct 36 for measuring at least one of a pressure, temperature, humidity, etc.

The fluid is compressed by the compressor 32 and the compressed fluid is sent to a combustor 40 via a path 42 to be mixed with fuel (e.g., natural gas) supplied by a feeding duct 44. More sensors 34 may be disposed in or around combustor 40 for measuring characteristics of the compressed fluid and/or the fuel. Combustion in combustor 40 takes place and this combustion raises the temperature of the mixture of compressed fluid and fuel to a firing temperature. Fuel is provided via feeding duct 44 to primary and secondary burners, as disclosed later. Valves 45a and 45b are used to provide fuel to the primary and secondary burners. A control unit 70 is also configured to adjust valves 45a and 45b to provide a desired percentage of the fuel to the primary and secondary valves. The flow of combusted gas, having a high energy, is supplied via ducts 52 to a turbine 50, which may be mechanically connected with a shaft 56 to a generator 54. The generator 54 may produce electric power. Turbine 50 is also mechanically connected via a shaft 58 to the compressor 30, thus supplying the required driving power to the compressor 30. Discharge gases are expelled from the turbine 50 through an outlet duct 60. Both the inlet duct 52 and the outlet duct 60 may be monitored by sensors 34.

Data from sensors 34 is provided to the control unit 70. The control unit 70 may receive additional data via an input port 72. Based on processes computed by the control unit 70, various commands are provided via an output port 74 to different parts of the gas turbine 30, e.g., commands to rotate the vanes, to modify a rotational speed of the shaft, etc. A detailed structure of the control unit 70 is discussed later.

According to an exemplary embodiment, the proposed new control of the gas turbine is based on a turbine temperature exhaust (ttx), which is measured/determined at outlet 60, versus the turbine pressure ratio (tpr), which is measured/determined as a ratio between a discharge pressure of the compressor 32 and an exhaust pressure of the turbine 50. With reference to FIG. 2, the discharge pressure of the compressor 32 is measured at point 80 and the exhaust pressure of the turbine 50 is measured at point 60. However, according to an exemplary embodiment, the exhaust pressure may be measured/estimated inside combustor 40, at an inlet of turbine 50 or inside turbine 50. These pressures are discussed later in more details. It is noted that the particulars discussed next for determining ttx are for illustrative purposes and not to limit the subject matter disclosed.

Figure 3:
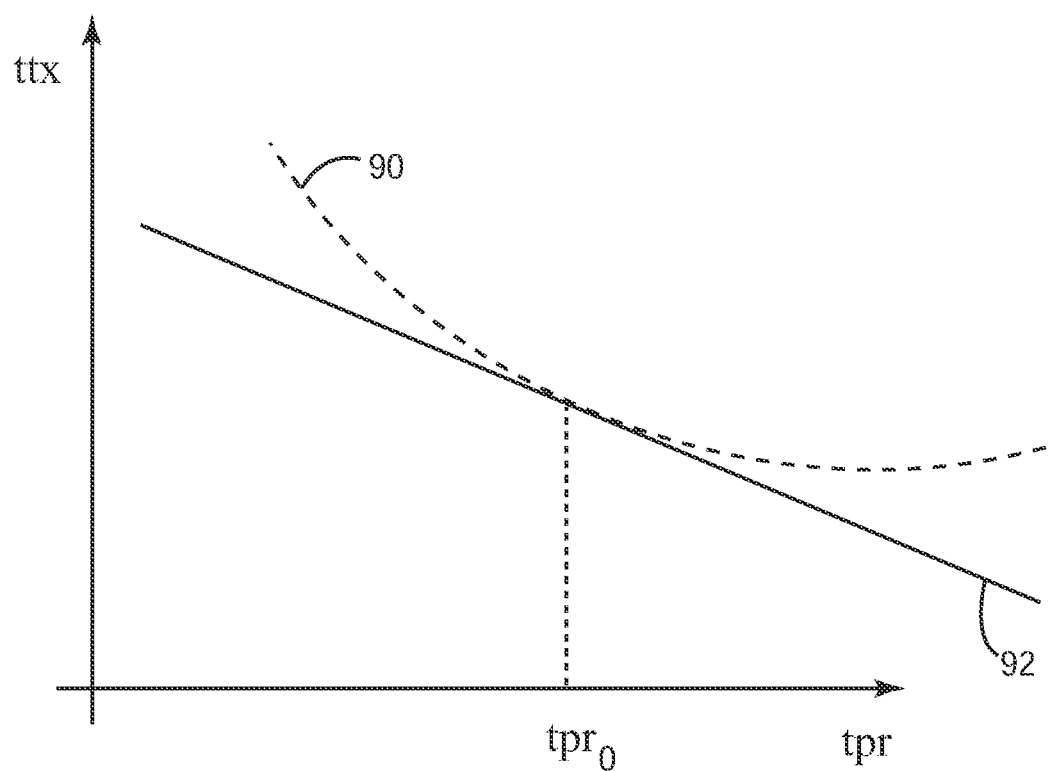
FIG. 3 is a graph illustrating the variation of an exhaust temperature versus a pressure ratio of the turbine according to an exemplary embodiment.
Figure 4:
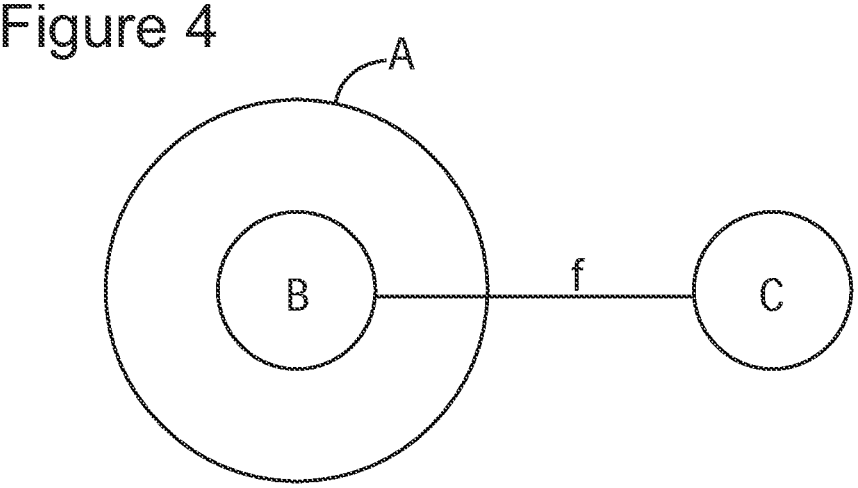
FIG. 4 is a schematic illustration of a relationship between operating points and optimal operating points of the gas turbine according to an exemplary embodiment.

FIG. 3 shows a (ttx, tpr) plane. Each point in this plane may be considered as belonging to a set A as shown in FIG. 4. Set A is defined as including operating points for the gas turbine 30 based on a combustion model. Set A includes a subset B of points. These points are determined as discussed next and are defined as optimum operating points for the gas turbine 30.

Those points of the plane (ttx, tpr), i.e., points from set A, that correspond to constant firing temperature, constant speed, constant IGV angle, constant air's specific humidity and constant bleed conditions may be represented by a curve 90, which may have an upwards concavity. The turbine pressure ratio tpr may vary with the compressor inlet temperature. An error introduced when approximating curve 90, which may be a parabola with its osculatory straight line 92 at $tpr=tpr_0$ is small and may be neglected for values of tpr near to $tpr_0$. One skilled in the art would recognize that other approximating functions may be used.

Varying gradually the compressor inlet temperature, the compressor speed and the IGV angle, the curve 90 changes gradually, for example, without any discontinuity in its prime derivative. Therefore, the constant firing temperature locus, which may be calculated based on ttx, can be approximated by the linear interpolation of the osculatory straight line 92.

Based on the points in set B discussed above, a function f to be discussed later, is applied to determine points belonging to a set C. The points of set C are set points for the gas turbine operation as per control logic. In other words, points belonging to set C are calculated, as discussed next, and the operator of the gas turbine 30 controls some parameters for maintaining the gas turbine within set C. FIG. 4 illustrates this concept.

According to an exemplary embodiment, function f may be defined as f=g·h·l, where g, h, and l are mathematical functions or operators. For example, g may be a linear interpolation with an opportune fuel characteristic, h may be a bilinear interpolation of the angles of IGV and gas turbine speed, and l may be a polytropic correction given by $p \cdot T^{((1-\gamma)/\gamma)}$=constant. Setting the domain B, the codomain C is entirely defined through function f. Local perturbations in B produce local perturbations in C. Depending on the application, more or less functions or different functions may be used for defining function f. In other words, instead of the g, h, and l functions discussed above, other functions may be used or a different number of functions.

Figure 5:
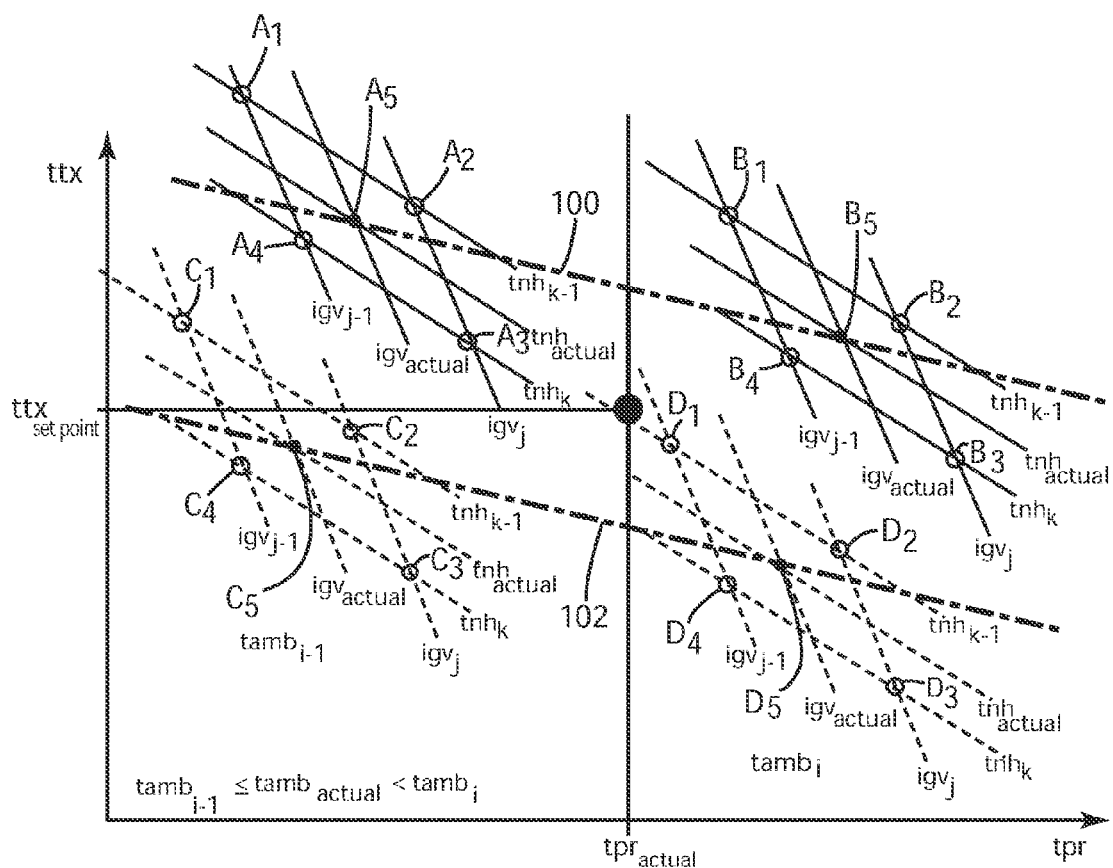
FIG. 5 is a schematic diagram of an exhaust temperature versus turbine pressure ratio plane according to an exemplary embodiment.

The determination of a set ttx temperatures, which is desired to be maintained for an efficient operation of the gas turbine 30 is now discussed. Assume that the gas turbine may operate in the following ranges: for an ambient temperature tamb, consider a range $tamb_{i-1} \leq tamb \leq tamb_i$, for an IGV angle igv, consider a range $igv_{j-1} \leq igv \leq igv_j$, and for a gas turbine speed tnh, consider a range $tnh_{k-1} \leq tnh \leq tnh_k$. Also suppose that the gas turbine is controlled at optimum firing temperature. Based on the above ranges, operational points of the gas turbine may be represented in the (ttx, tpr) space shown in FIG. 5 by curves defined by the following points. There are four points A1 to A4 for a lean fuel and for the lowest ambient temperature; there are four points B1 to B4 for the lean fuel and for the highest ambient temperature; there are four points C1 to C4 for a rich fuel and the lowest ambient temperature; and there are four points D1 to D4 for the rich fuel and the highest ambient temperature. The number of points may vary according to the nature of the interpolating function.

The lean fuel and the rich fuel are defined as follow. Gas turbines for industrial applications are using natural gas that includes $CH_4$ more than 90%. Natural gas is considered to be a rich gas fuel. Blending the natural gas with inert gases, for example, nitrogen, carbon dioxide, and argon, produces leaner gas fuels, i.e., lower LHV value (LHV is the lower heating value of the gas and describes the amount of energy that can be obtained from a unit of mass of the gas by burning the gas). The rich fuel may be obtained by blending the natural gas with heavier hydrocarbons, like ethane, propane, and/or butane.

For each of the above discussed set of points, a central point (A5, B5, C5 and D5) is calculated using two bilinear interpolations (function g discussed above). A bilinear interpolation is an extension of linear interpolation for interpolating functions of two variables on a regular grid. The bilinear interpolation performs linear interpolation first in one direction, and then again in the other direction. Points A5 and B5 define a temperature control curve 100 for the lean gas and points C5 and D5 define a temperature control curve 102 for the rich gas. As discussed above, another function than a bilinear interpolation may be used.

A $ttx_{set\ point}$ is determined by using a linear interpolation (function h discussed above or, in another application, other functions) of the two ordinates corresponding to the actual pressure ratios on the two control curves 100 and 102, based on the $LHV_{actual\ gas}$, the $LHV_{rich\ gas}$ and the $LHV_{lean\ gas}$.

Figure 6:
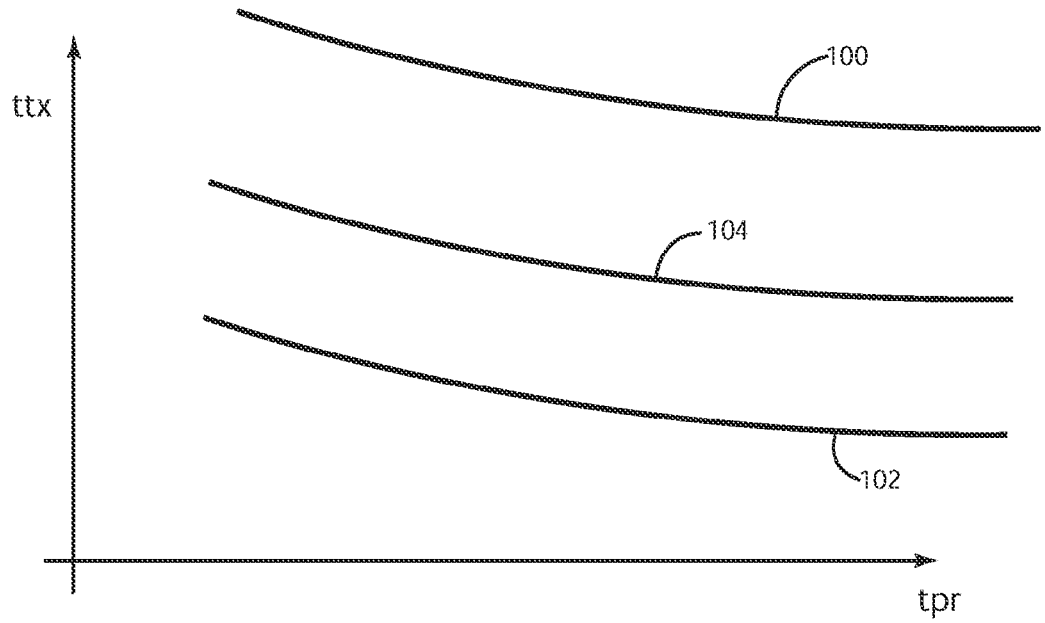
FIG. 6 is a schematic diagram of a reference exhaust temperature curve in the plane of FIG. 5 according to an exemplary embodiment.

If more points are calculated for other conditions and/or values of the considered parameters, more $ttx_{set\ point}$ may be determined. Plotting these points versus a corresponding tpr ratio results in a reference exhaust temperature curve 104, which is shown in FIG. 6. It is noted that the reference exhaust temperature curve 104 lies between the two control curves 100 and 102. According to an exemplary embodiment (not illustrated), curve 104 is parallel to curves 100 and 102.

Figure 7:
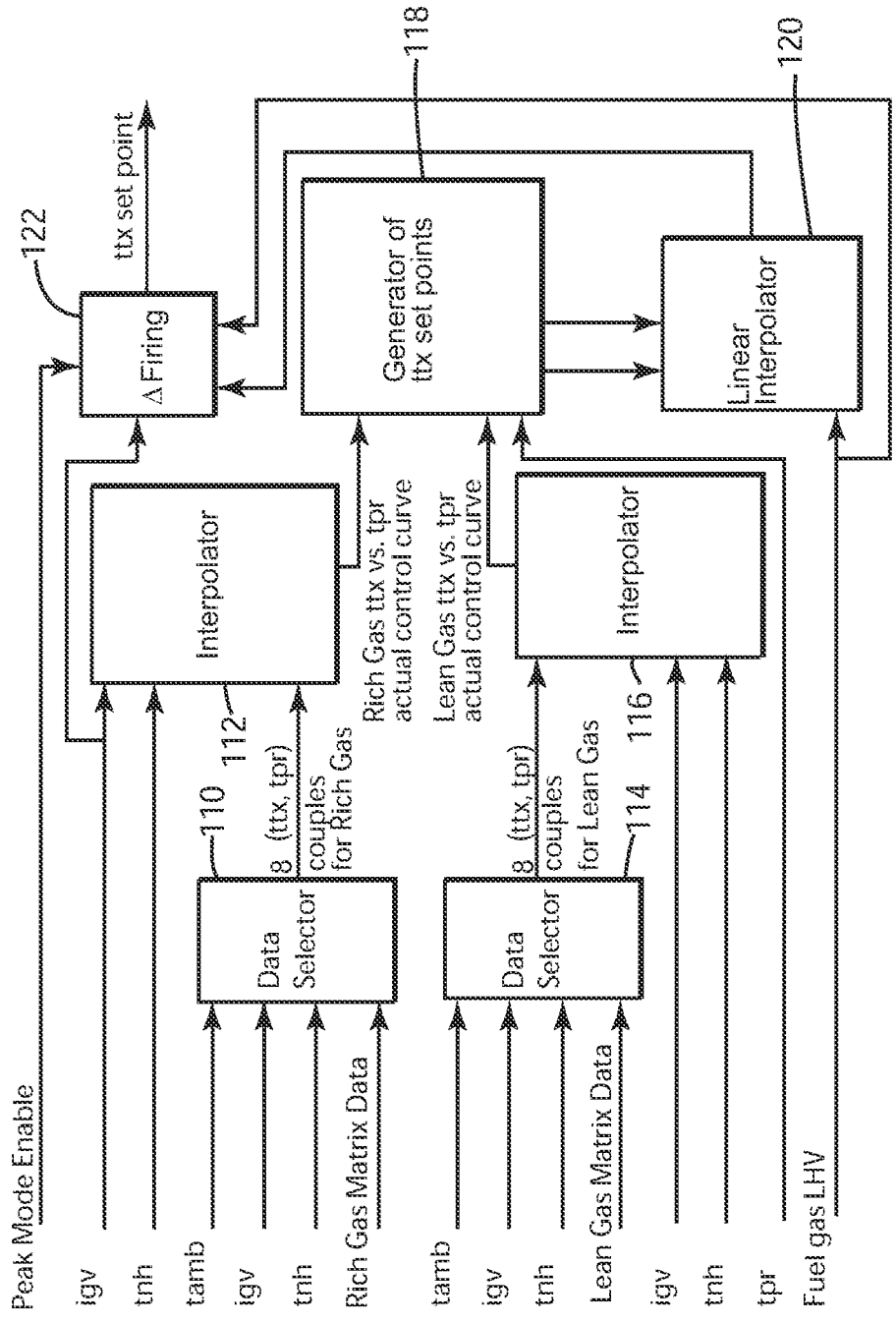
FIG. 7 is a flow chart illustrating a method for calculating an exhaust temperature set point for the turbine according to an exemplary embodiment.

The method for calculating the $ttx_{set\ point}$ may be represented in the block diagram shown in FIG. 7. According to this figure, data selector unit 110 receives as input the ambient temperature tamb, the rotation angle of the vanes IGV, the rotational speed tnh of the shaft and the rich gas matrix data. An example of the rich gas matrix data is:

| | | | ttxr | | |
| --- | --- | --- | --- | --- | --- |
| | | | $tamb_i$ | | |
| $ttxr_{i,j,k}$ | $igv_1$ | $igv_2$ | ... | $igv_5$ | $igv_6$ |
| $tnh_1$ | $ttxr_{i,1,1}$ | $ttxr_{i,2,1}$ | ... | $ttxr_{i,5,1}$ | $ttxr_{i,6,1}$ |
| $tnh_2$ | $ttxr_{i,1,2}$ | ... | ... | ... | ... |
| $tnh_3$ | $ttxr_{i,1,3}$ | ... | ... | ... | ... |
| $tnh_4$ | $ttxr_{i,1,4}$ | ... | ... | ... | $ttxr_{i,6,4}$ | and the turbine pressure ratio matrix for rich gas is given by:

| | | | tprr | | |
| --- | --- | --- | --- | --- | --- |
| | | | $tamb_i$ | | |
| $tprr_{i,j,k}$ | $igv_1$ | $igv_2$ | $igv_3$ | $igv_5$ | $igv_6$ |
| $tnh_1$ | $tprr_{i,1,1}$ | $tprr_{i,2,1}$ | $tprr_{i,3,1}$ | $tprr_{i,5,1}$ | $tprr_{i,6,1}$ |
| $tnh_2$ | $tprr_{i,1,2}$ | ... | ... | ... | ... |
| $tnh_3$ | $tprr_{i,1,3}$ | ... | ... | ... | ... |
| $tnh_4$ | $tprr_{i,1,4}$ | ... | ... | ... | $tprr_{i,6,4}$ |

Eight points C1 to C4 and D1 to D4 (shown in FIG. 5) are output by the data selector unit 110. This output is provided as input to interpolator unit 112. The same process is repeated by data selector unit 114 for the same parameters except that a lean gas matrix data is used instead of the rich gas matrix data. Output from interpolators 112 and 116, i.e., rich gas ttx versus tpr actual control curve and lean gas ttx versus tpr actual control gas, are provided as input to calculation unit 118 for calculating two ttx set points. Linear interpolator 120 receives the two ttx set points and interpolates them to produce a final point, the $ttx_{set\ point}$. Based on the output of the linear interpolator 120, a firing unit 122 may calculate variations of the $ttx_{set\ point}$ of the gas turbine. It is noted that the linear interpolator 120 and the firing unit 122 may receive directly information about the fuel gas LHV.

Having the $ttx_{set\ point}$, controller 70 may be programmed to monitor this value and to adjust various parameters of the gas turbine 30 (e.g., angle of IGV, fuel amount, etc.) to maintain the $ttx_{set\ point}$ in a predetermined range for an efficient operation of the gas turbine. In one exemplary embodiment in which a single shaft gas turbine is used, the $ttx_{set\ point}$ may be adjusted by controlling the IGV angle. The reference exhaust temperature curve ttxh 104, which the gas turbine is desired to follow, is now calculated.

Consider three vectors that identify the gas turbine operating parameters. These vectors are tamb, igv, and tnh, and they correspond to the ambient temperature, angle of IGV vanes, and shaft's rotational speed. The mathematical expressions for these three vectors are:

$$tamb=[tamb_i]=[tamb_1, tamb_2, \ldots, tamb_7]$$

with index i being:

2 if $tamb < tamb_2$ 3 if $tamb_2 \le tamb < tamb_3$ 4 if $tamb_3 \le tamb < tamb_4$ 5 if $tamb_4 \le tamb < tamb_5$ 6 if $tamb_5 \le tamb < tamb6$ 7 if $tamb_6 \le tamb$, where tamb is the actual ambient temperature.
The igv angle vector is defined as:

$$igv=[igv_j]=[igv_1, igv_2, \ldots, igv_6] \text{ with index } j \text{ being:}$$

2 if $igv < igv_2$ 3 if $igv_2 \le igv < igv_3$ 4 if $igv_3 \le igv < igv_4$ 5 if $igv_4 \le igv < igv_5$ 6 if $igv_5 \le igv$, where igv is the actual igv angle.
The tnh shaft speed vector is defined as:

$$tnh=[tnh_k]=[tnh_1, tnh_2, tnh_3, tnh_4] \text{ with index } k \text{ being:}$$

2 if $tnh < tnh_2$ 3 if $tnh_2 \le tnh < tnh_3$ 4 if $tnh_3 \le tnh$, where tnh is the actual shaft speed percentage. The values for i, j, and k differ from application to application and may include a large number of possibilities.

Four 3D matrices are introduced for calculating the reference exhaust temperature curve ttxh, i.e., a reference curve used by the operator for controlling the gas turbine. According to an exemplary embodiment, ttxh can be seen as a locus of points where the gas turbine operates at optimal ttx and tpr values. The four matrices are the exhaust temperature lean fuel matrix ttxl, the pressure ratio lean fuel matrix tprl, the exhaust temperature rich fuel matrix ttxr, and the pressure ratio rich fuel tprr. Elements of these matrices are listed below:

$$ttxl=[ttxl_{i,j,k}] \text{ for lean fuel,}$$

$$tprl=[tprl_{i,j,k}] \text{ for lean fuel,}$$

$$ttxr=[ttxr_{i,j,k}] \text{ for rich fuel, and}$$

$$tprr=[tprr_{i,j,k}] \text{ for rich fuel.}$$

Assuming that the actual operating conditions tamb, igv and tnh are within ranges $tamb_{i-1} \le tamb < tamb_i$; $igv_{j-1} \le igv < igv_j$; and $tnh_{k-1} \le tnh < tnh_k$, the actual reference curve ttxh is given by $$ttxh=ttxha+\Delta ttxh,$$

where ttxha defines a reference curve for the operation of the gas turbine at optimal ttx and tpr points, but also taking into account compressor inlet pressure and gas turbine exhaust pressure drop, and $\Delta ttxha$ is a correction of ttxha that is used to maintain the turbine firing temperature at optimum values while the inlet and exhaust pressure drops of the turbine vary.

Reference curve ttxha is defined as $$ttxha=ttxhr \cdot (LHV-LHVl)/(LHV-LHVl)+ttxhl \cdot (LHVr-LHV)/(LHVr-LHVl),$$

where the parameters defining ttxha are defined as follows:

$$ttxhr=ttxr_{i-1}+(ttxr_i-ttxr_{i-1})/(tprr_i-tprr_{i-1}) \cdot (tpr-tprr_{i-1}),$$

$$ttxhl=ttxl_{i-1}+(ttxl_i-ttxl_{i-1})/(tprl_i-tprl_{i-1}) \cdot (tpr-tprl_{i-1}),$$

LHV is the lower heating value of the actual fuel,
LHVl is the lower heating value of the lean fuel,
LHVr is the lower heating value of the rich fuel.
The following bilinear interpolations are applied:

$ttxl_{i-1}$=BilinearInterpolation($ttxl_{i-1,j-1,k-1}$, $ttxl_{i-1,j,k-1}$, $ttxl_{i-1,j,k}$, $ttxl_{i-1,j-1,k}$, igv, tnh)=$ttxl_{i-1,j-1,k-1} \cdot (igv_j-igv)/(igv_j-igv_{j-1}) \cdot (tnh_k-tnh)/(tnh_k-tnh_{k-1})+ttxl_{i-1,j,k-1} \cdot (igv-igv_{j-1})/(igv_j-igv_{j-1}) \cdot (tnh_k-tnh)/(tnh_k-tnh_{k-1})+ttxl_{i-1,j,k} \cdot (igv-igv_{j-1})/(igv_j-igv_{j-1}) \cdot (tnh-tnh_{k-1})/(tnh_k-tnh_{k-1})+ttxl_{i-1,j-1,k} \cdot (igv_j-igv)/(igv_j-igv_{j-1}) \cdot (tnh-tnh_{k-1})/(tnh_k-tnh_{k-1})$, $ttxl_i$=BilinearInterpolation($ttxl_{i,j-1,k-1}$, $ttxl_{i,j,k-1}$, $ttxl_{i,j,k}$, $ttxl_{i,j-1,k}$, igv, tnh)=$ttxl_{i,j-1,k-1} \cdot (igv_j-igv)/(igv_j-igv_{j-1}) \cdot (tnh_k-tnh)/(tnh_k-tnh_{k-1})+ttxl_{i,j,k-1} \cdot (igv-igv_{j-1})/(igv_j-igv_{j-1}) \cdot (tnh_k-tnh)/(tnh_k-tnh_{k-1})+ttxl_{i,j,k} \cdot (igv-igv_{j-1})/(igv_j-igv_{j-1}) \cdot (tnh-tnh_{k-1})/(tnh_k-tnh_{k-1})+ttxl_{i,j-1,k} \cdot (igv_j-igv)/(igv_j-igv_{j-1}) \cdot (tnh-tnh_{k-1})/(tnh_k-tnh_{k-1})$, $tprl_{i-1}$=BilinearInterpolation($tprl_{i-1,j-1,k-1}$, $tprl_{i-1,j,k-1}$, $tprl_{i-1,j,k}$, $tprl_{i-1,j-1,k}$, igv, tnh)=$tprl_{i-1,j-1,k-1} \cdot (igv_j-igv)/(igv_j-igv_{j-1}) \cdot (tnh_k-tnh)/(tnh_k-tnh_{k-1})+tprl_{i-1,j,k-1} \cdot (igv-igv_{j-1})/(igv_j-igv_{j-1}) \cdot (tnh_k-tnh)/(tnh_k-tnh_{k-1})+tprl_{i-1,j,k} \cdot (igv-igv_{j-1})/(igv_j-igv_{j-1}) \cdot (tnh-tnh_{k-1})/(tnh_k-tnh_{k-1})+tprl_{i-1,j-1,k} \cdot (igv_j-igv)/(igv_j-igv_{j-1}) \cdot (tnh-tnh_{k-1})/(tnh_k-tnh_{k-1})$, $tprl_i$=BilinearInterpolation($tprl_{i,j-1,k-1}$, $tprl_{i,j,k-1}$, $tprl_{i,j,k}$, $tprl_{i,j-1,k}$, igv, tnh)=$tprl_{i,j-1,k-1} \cdot (igv_j-igv)/(igv_j-igv_{j-1}) \cdot (tnh_k-tnh)/(tnh_k-tnh_{k-1})+tprl_{i,j,k-1} \cdot (igv-igv_{j-1})/(igv_j-igv_{j-1}) \cdot (tnh_k-tnh)/(tnh_k-tnh_{k-1})+tprl_{i,j,k} \cdot (igv-igv_{j-1})/(igv_j-igv_{j-1}) \cdot (tnh-tnh_{k-1})/(tnh_k-tnh_{k-1})+tprl_{i,j-1,k} \cdot (igv_j-igv)/(igv_j-igv_{j-1}) \cdot (tnh-tnh_{k-1})/(tnh_k-tnh_{k-1})$, $ttxr_{i-1}$=BilinearInterpolation ($ttxr_{i-1,j-1,k-1}$, $ttxr_{i-1,j,k-1}$, $ttxr_{i-1,j,k}$, $ttxr_{i-1,j-1,k}$, igv, tnh)=$ttxr_{i-1,j-1,k-1} \cdot (igv_j-igv)/(igv_j-igv_{j-1}) \cdot (tnh_k-tnh)/(tnh_k-tnh_{k-1})+ttxr_{i-1,j,k-1} \cdot (igv-igv_{j-1})/(igv_j-igv_{j-1}) \cdot (tnh_k-tnh)/(tnh_k-tnh_{k-1})+ttxr_{i-1,j,k} \cdot (igv-igv_{j-1})/(igv_j-igv_{j-1}) \cdot (tnh-tnh_{k-1})/(tnh_k-tnh_{k-1})+ttxr_{i-1,j-1,k} \cdot (igv_j-igv)/(igv_j-igv_{j-1}) \cdot (tnh-tnh_{k-1})/(tnh_k-tnh_{k-1})$, $ttxr_i$=BilinearInterpolation($ttxr_{i,j-1,k-1}$, $ttxr_{i,j,k-1}$, $ttxr_{i,j,k}$, $ttxr_{i,j-1,k}$, igv, tnh)=$ttxr_{i,j-1,k-1} \cdot (igv_j-igv)/(igv_j-igv_{j-1}) \cdot (tnh_k-tnh)/(tnh_k-tnh_{k-1})+ttxr_{i,j,k-1} \cdot (igv-igv_{j-1})/(igv_j-igv_{j-1}) \cdot (tnh_k-tnh)/(tnh_k-tnh_{k-1})+ttxr_{i,j,k} \cdot (igv-igv_{j-1})/(igv_j-igv_{j-1}) \cdot (tnh-tnh_{k-1})/(tnh_k-tnh_{k-1})+ttxr_{i,j-1,k} \cdot (igv_j-igv)/(igv_j-igv_{j-1}) \cdot (tnh-tnh_{k-1})/(tnh_k-tnh_{k-1})$, $tprr_{i-1}$=BilinearInterpolation($tprr_{i-1,j-1,k-1}$, $tprr_{i-1,j,k-1}$, $tprr_{i-1,j,k}$, $tprr_{i-1,j-1,k}$, igv, tnh)=$tprr_{i-1,j-1,k-1} \cdot (igv_j-igv)/(igv_j-igv_{j-1}) \cdot (tnh_k-tnh)/(tnh_k-tnh_{k-1})+tprr_{i-1,j,k-1} \cdot (igv-igv_{j-1})/(igv_j-igv_{j-1}) \cdot (tnh_k-tnh)/(tnh_k-tnh_{k-1})+tprr_{i-1,j,k} \cdot (igv-igv_{j-1})/(igv_j-igv_{j-1}) \cdot (tnh-tnh_{k-1})/(tnh_k-tnh_{k-1})+tprr_{i-1,j-1,k} \cdot (igv_j-igv)/(igv_j-igv_{j-1}) \cdot (tnh-tnh_{k-1})/(tnh_k-tnh_{k-1})$, and $tprr_i$=BilinearInterpolation($tprr_{i,j-1,k-1}$, $tprr_{i,j,k-1}$, $tprr_{i,j,k}$, $tprr_{i,j-1,k}$, igv, tnh)=$tprr_{i,j-1,k-1} \cdot (igv_j-igv)/(igv_j-igv_{j-1}) \cdot (tnh_k-tnh)/(tnh_k-tnh_{k-1})+tprr_{i,j,k-1} \cdot (igv-igv_{j-1})/(igv_j-$ $igv_{j-1})\cdot(tnh_k-tnh)/(tnh_k-tnh_{k-1})+tprr_{i,j,k}\cdot(igv-igv_{j-1})/(igv_j-igv_{j-1})\cdot(tnh-tnh_{k-1})/(tnh_k-tnh_{k-1})+tprr_{i,j-1,k}\cdot(igv_j-igv)/(igv_j-igv_{j-1})\cdot(tnh-tnh_{k-1})/(tnh_k-tnh_{k-1})$ The correction $\Delta ttxh$ is given by:

$\Delta ttxh = ttxh \cdot ((pamb_{actual} + \Delta p_{exhaust\ ref})/(pamb_{actual} + \Delta pexhaust)^{(\gamma/(1-\gamma))-1)} + ((pamb_{actual} - \Delta p_{inlet\ ref})/(pamb_{actual} - \Delta p_{inlet}))^{(\gamma/(1-\gamma))-1)})$, where $\gamma = a \cdot tpr + b$ with a and b being constants and $\gamma$ is made to fit the gas turbine polytropic expansion ($p \cdot t^{((1-\gamma)/\gamma)} = $ constant).

The correction $\Delta ttxh$ takes into account, among other things, the actual gas turbine exhaust and inlet pressure drops. As the gas turbine temperature control curves (ttxh for example) depend on a reference exhaust pressure drop $\Delta p_{exhaust\ ref}$ and reference inlet pressure drop $\Delta p_{inlet\ ref}$, it is possible to correct these curves for different exhaust and inlet pressure drops by using, for example, function $\Delta ttxh$.

The actual inlet pressure drop value $\Delta p_{inlet\ act}$ may be measured instead of being estimated due to the amount of dirt at the input of the compressor. In other words, the compressor inlet system pressure drop depends on the flow conditions and on the dirt in the inlet filter, the periodic dirt deposition and removal may cause an unpredictable variability of the inlet pressure drop over the time. In an application, if the LHV signal is not available, for example due to calorimeter fault or calibration problems, the controller 70 may be configured to use a $LHV_{default}$ to override the actual LHV.

The above bilinear interpolations, linear interpolation and polytropic expansion, when applied as indicated above to the parameters of the gas turbine, for example, IGV angles and shaft rotational speed at various points i, j, and k of the allowed ranges, generate the $ttx_{set\ point}$ on the reference curve ttxh. In one exemplary embodiment, multiple $ttx_{set\ point}$ are calculated for the gas turbine for various conditions and all these points $ttx_{set\ point}$ are part of the ttxh curve. Other reference curves may be determined from ttxh, as discussed next. These additional reference curves may also be used to control the operation of the gas turbine.

According to an exemplary embodiment, a reference exhaust temperature versus compressor pressure ratio curve TTRX may be used to control the gas turbine. The TTRX curve may be defined as TTRX=Min(Isotherm$_{NO}$, ttxh), where Isotherm$_{NO}$ is defined as an isotherm of the gas turbine at normal operating conditions. In one application, the Isotherm$_{NO}$ represents the maximum temperature to which the rotor of the turbine may be exposed. A control curve for the exhaust temperature versus IGV may be defined as TTRXGV=TTRX. A control curve for the exhaust temperature versus fuel may be defined as TTRXB=TTRXB$_{NO}$ if a peak load mode is off and TTRXB=TTRXB$_{PK}$ if the peak load mode is on. The peak load mode is defined as a gas turbine that runs at constant operating conditions (ambient temperature, pressure, shaft speed, IGV position, and fuel gas composition) and delivers a power higher than the nominal one. This condition occurs when the gas turbine's operating firing temperature is higher than the nominal temperature. TTRXB$_{NO}$ is given by TTRX+Min((IGV$_{max}$−IGV$_{set\ point}$)·$\Delta 1$, $\Delta 2$), where $\Delta 2$ is a value that limits the value of the Min function, and TTRXB$_{PK}$ is given by Min(Isotherm$_{PK}$, ttxh+$\Delta PK$).

$\Delta PK$ is given by $\Delta PK(=\Delta ttxr \cdot (LHV-LHVl)/(LHVr-LHVl)+\Delta ttxl \cdot (LHVr-LHV)/(LHVr-LHVl)$, with LHV being the lowest heating value of the actual fuel, LHVl being the lowest heating value of the lean fuel,
LHVr being the lowers heating value of the rich fuel, $\Delta ttxl = \Delta ttxl_{i-1} + (\Delta ttxl_i - \Delta ttxl_{i-1}) \cdot (tamb - tamb_{i-1})/(tamb_i - tamb_{i-1})$, and $\Delta ttxr = \Delta ttxr_{i-1} + (\Delta ttxr_i - \Delta ttxr_{i-1}) \cdot (tamb - tamb_{i-1})/(tamb_i - tamb_{i-1})$.

The above exhaust temperature control via IGV and exhaust temperature control via fuel curves may be used in the control of the gas turbine as follows. A gas turbine may be controlled by varying, for example, the speed of the shaft of the turbine, the angle of IGV (that directly controls the amount of air provided to the compressor), the amount of fuel provided to the combustor, the ratio of fuel/air provided to the combustor, etc. According to an exemplary embodiment, for a single shaft gas turbine, the angle of the IGV is used first to control the operation of the gas turbine, i.e., to maintain the $ttx_{act\ point}$ on the ttxh curve calculated above (in the ttx versus tpr plane). In other words, when the actual $ttx_{act\ point}$ deviates from the ttxh curve due to various conditions of the gas turbine (e.g., change in load), a first control adjusts the angle of IGV for bringing the $ttx_{act\ point}$ of the gas turbine to the $ttx_{set\ point}$. However, this control may reach a saturation point, i.e., a point at which the angle of IGV may not be modified further or it is not desired to be modified further. At this point, an amount of fuel to be provided to the gas turbine may be varied until the $ttx_{act\ point}$ is made to coincide with the $ttx_{set\ point}$. If this control becomes saturated, it is possible to change a ratio between the fluid provided by the compressor and the fuel injected into the combustor, thus limiting the fuel flow rate and further regulating $ttx_{act\ point}$.

To fully determine the ttxh curve in the ttx versus tpr plane, it is next discussed the determination of the turbine pressure ratio tpr. The gas turbine exhaust pressure is less difficult to be estimated than to be measured. Although the pressures involved in the turbine pressure ratio tpr may be measured, it is preferred to calculate tpr as discussed next because it is more accurate than the measured tpr. In this regard, it is noted that vortices may appear at locations 80 and 60 in the gas turbine, which make the measured pressures less accurate as they may vary across a small distance. The estimation may be performed based on characteristics of a flue pressure drop, exhaust gas data and ambient pressure. According to an exemplary embodiment, the turbine pressure ratio tpr is determined based on the estimated exhaust pressure drop and the absolute compressor discharge pressure. In one embodiment, the exhaust pressure drop is determined at point 60 (see FIG. 2) while the absolute compressor discharge pressure is determined at point 80 (see FIG. 2). In another embodiment, for a compressor having multiple stages, the absolute compressor discharge pressure is determined after the discharge diffuser, which is downstream of the last stage. According to this exemplary embodiment, the absolute compressor discharge pressure is measured.

According to an exemplary embodiment, the exhaust pressure drop is made up by two terms, the pressure drop due to a mass flowing in the flue of the turbine 50 and a pressure recovery due to a chimney effect. The chimney effect may appear if there is a height difference between the gas turbine exhaust and the flue discharge to the atmosphere. The first term is given by $a_a \cdot \rho_{exhaust} \cdot v^2$ and the second term is given by $(\rho_{air} - \rho_{exhaust}) \cdot \Delta h$. The meaning of each constant, parameter and variable used in the present calculations is provided later. Thus, the total exhaust pressure drop due to the flowing mass in the flue can be expressed as:

$\Delta p_{exhaust} = a_a \cdot \rho_{exhaust} \cdot v^2 - (\rho_{air} - \rho_{exhaust}) \cdot \Delta h$, which may be rewritten as $a_a \cdot \rho_{exhaust} \cdot v^2 = a_a \cdot \rho_{exhaust} \cdot (W_{exhaust}/(\rho_{exhaust} \cdot a_b))^2 =$ $a_a \cdot (W_{exhaust}/a_b)^2/\rho_{exhaust} = a/\rho_{exhaust} \cdot W_{exhaust}^2$.

To simplify this expression, assume that the density $\rho$ of the gas in the flue is independent of the actual exhaust pressure drop and depends only on the discharge pressure, which here is the ambient pressure, as the exhaust pressure drop is assumed to be only a small fraction of the ambient pressure. Thus, the error introduced by this simplification can be neglected. The exhaust gas density $\rho_{exhaust}$ can be expressed as:

$\rho_{exhaust} = \rho_{exhaust\ ref} \cdot ttx_{ref}/ttx_{act} \cdot pamb_{act}/pamb_{ref}$.

The ambient air density can be expressed as:

$\rho_{air} = \rho_{air\ ref} \cdot tamb_{ref}/tamb_{act} \cdot pamb_{act}/pamb_{ref}$, where:
- $\rho_{exhaust}$ is the density of the exhaust gas at the $ttx_{act}$ temperature and $pamb_{act}$ ambient pressure,
- $\rho_{exhaust\ ref}$ is the density of the exhaust gas at the $ttx_{ref}$ temperature and $pamb_{ref}$ ambient pressure,
- $\rho_{air}$ is the density of the ambient air at the actual pressure and temperature,
- $\rho_{air\ ref}$ is the density of the ambient air at the reference pressure and temperature,
- $\Delta h$ is the elevation difference between the gas turbine exhaust and the flue discharge to the atmosphere,
- $v$ is the exhaust speed inside the flue,
- $ttx_{ref}$ is the reference exhaust temperature,
- $ttx_{act}$ is the actual exhaust temperature,
- $pamb_{ref}$ is the reference ambient pressure,
- $pamb_{act}$ is the actual ambient pressure,
- $Wexhaust_{act}$ is the actual exhaust gas mass flow rate, and
- $a$ is a constant typical for the specific exhaust duct.

It is assumed in this exemplary embodiment that the exhaust gas composition is substantially constant over a premixed mode operation, and thus, its density is substantially constant at a given temperature.

The exhaust gas mass flow rate may be estimated as follows. Assume that the compressor air mass flow rate is independent of the compressor pressure ratio as the error introduced by this assumption is negligible for the purpose of the exhaust pressure drop estimation. The gas turbine's axial compressor air mass flow rate can be estimated by the following transfer function:

$Wair_{act} = SG_{ha} \cdot pinlet_{act}/pinlet_{ref} \cdot (f_3 \cdot x^3 + f_2 \cdot x^2 + f_1 \cdot x + f_0) \cdot f_4 \cdot Wair_{ref} \cdot k$, where $f_0 = a_0 \cdot y^3 + b_0 \cdot y^2 + c_0 \cdot y$, $f_1 = a_1 \cdot y^3 + b_1 \cdot y^2 + c_1 \cdot y$, $f_2 = a_3 \cdot y^3 + b_1 \cdot y^2 + c_2 \cdot y$, $f_3 = a_3 \cdot y^3 + b_1 \cdot y^2 + c_3 \cdot y$, $f4 = a_{41} \cdot z^3 + b_{41} \cdot z^2 + c_{41} \cdot z + d_{41}$ if $tnh_{act}/tnh_{ref} < tnh_{threshold}$, $a_{42} \cdot z^3 + b_{42} \cdot z^2 + c_{42} \cdot z + d_{42}$ if $tnh_{act}/tnh_{ref} > tnh_{threshold}$, $x = igv_{act}/igv_{ref}$, $y = tnh_{act}/tnh_{ref} \cdot (tinlet_{ref}/tinlet_{act})^{0.5}$, $z = tnh_{act}/tnh_{ref} \cdot (tinlet_{ref}/tinlet_{act})$, and $a_i$ and $a_{ij}$ are application-specific constants.

Because the gas turbine is equipped with an IBH system, at some partial load operating conditions, a fraction of the compressor's air mass flow rate is recirculated and does not enter the exhaust duct. Moreover, the fuel gas mass flow rate enters entirely through the exhaust duct. Therefore, $Wexhaust_{act} = Wair_{act} \cdot (1 - IBH_{fraction}) + Wfuel_{act}$. In this exemplary embodiment, it has been assumed that the air to the bearings compensates the air from the cooling blowers.

Considering that while the gas turbine is on exhaust temperature control and the fuel/air mass ratio is substantially constant for a specific fuel gas composition, the fuel/air mass flow ratio may be evaluated as follows:

$fa_{ratio} = Wfuel_{act}/Wair_{act} = Wfuel_{ref}/Wair_{ref} \cdot LHV_{ref}/LHV_{act} = fa_{ratio\ ref} \cdot LHV_{ref}/LHV_{act}$.

The $IBH_{fraction}$ is a set point generated by the control panel and controlled while the system is not at fault. Then, the exhaust mass flow rate may be evaluated as:

$Wexhaust_{act} = Wair_{act} \cdot (1 - IBH_{fraction}) \cdot (1 + fa_{ratio\ ref} \cdot LHV_{ref}/LHV_{act})$.

The specific gravity of humid air $SG_{ha}$ can be evaluated based on the specific humidity as follows:

$SG_{ha} = \rho_{ha}/\rho_{da}$, $m_{ha} = m_{da} + m_{wv}$, $m_{da} = m_{ha} \cdot (1 - sh)$, $m_{wv} = m_{ha} \cdot sh$, and $v_{ha} = m_{ha}/\rho_{ha} = m_{da}/\rho_{da} + m_{wv}/\rho_{wv}$.

Multiplying this last expression by $\rho_{ha}$, the following equation is obtained:

$m_{ha} = m_{da} \cdot \rho_{ha}/\rho_{da} + m_{wv} \cdot \rho_{ha}/\rho_{wv}$, where $\rho_{ha}/\rho_{da} = SG_{ha}$ and $\rho_{ha}/\rho_{wv} = \rho_{ha} \cdot \rho_{da}/\rho_{da} \cdot \rho_{wv} = SG_{ha}/SG_{wv}$.

Thus, $m_{ha} = m_{da} \cdot \rho_{ha}/\rho_{da} + m_{wv} \cdot \rho_{ha}/\rho_{wv} = m_{da} \cdot SG_{ha} + m_{wv} \cdot SG_{ha}/SG_{wv}$, or $m_{ha} = (1 - sh) \cdot m_{ha} \cdot SG_{ha} + sh \cdot m_{ha} \cdot SG_{ha}/SG_{wv}$.

Dividing this last expression by $m_{ha}$ $1 = (1 - sh) \cdot SG_{ha} + sh \cdot SG_{ha}/SG_{wv}$, or $SG_{wv} = SG_{ha} \cdot ((1 - sh) \cdot SG_{wv} + sh)$.

Finally, $SG_{ha} = SG_{wv}/((1 - sh) \cdot SG_{wv} + sh)$.

If the specific humidity signal is not available or the transmitter is in a fault mode, the specific humidity signal can be substituted by a curve of specific humidity versus ambient temperature generated by the interpolation of the data shown in Table 1:

TABLE 1

| shdefault | | | Average air specific humidity vs. ambient temperature | | | | |
|---|---|---|---|---|---|---|---|
| tamb | tamb$_1$ | tamb$_2$ | ... | ... | ... | tamb$_6$ | tamb$_7$ |
| sh$_i$ | sh$_1$ | sh$_2$ | ... | ... | ... | sh$_6$ | sh$_7$ |

The following notations have been used in the above calculations:
- $pinlet_{act}$ is the actual air pressure at the compressor inlet,
- $pinlet_{ref}$ is the reference air pressure at the compressor inlet,
- tamb is the ambient temperature,
- $tinlet_{act}$ is the actual air temperature at the compressor inlet, may be measured with at least two thermocouples such that the maximum reading of the thermocouples is considered to be tinlet$_{act}$ or in case that one thermocouple is faulty and/or the difference in readings is too large (for example 10 F), tamb is considered to be tinle-t$_{act}$, tinlet$_{ref}$ is the reference air temperature at the compressor inlet, tnh$_{act}$ is the compressor actual speed, tnh$_{ref}$ is the compressor reference speed, igv$_{act}$ is the actual igv angle, igv$_{ref}$ is the reference igv angle, Wair$_{act}$ is the actual air mass flow rate at the compressor inlet, Wair$_{ref}$ is the reference air mass flow rate at the compressor inlet, Wexhaust$_{act}$ is the actual exhaust gas mass flow rate, Wfuel$_{act}$ is the fuel mass flow rate, IBH$_{fraction}$ is the fraction of air bled from the compressor discharge, m is fa$_{ratio\ ref}$ is the reference fuel air mass ratio, LHV$_{ref}$ is the reference gas fuel's LHV, LHV$_{act}$ is the actual gas fuel's LHV, sh is the air specific humidity, SG$_{xx}$ is the specific gravity of xx (see subscript list below), ρ$_{xx}$ is the density of xx (see subscript list below), m$_{xx}$ is the mass of xx (see subscript list below), Vxx volume of xx (see subscript list below), ha is humid air, wv is water vapor, and da is dry air.

Having calculated the specific gravity, the mass flow rate through the compressor and other parameters as discussed above, it is now possible to calculate the turbine pressure ratio tpr. The algorithm for calculating tpr may be summarized as follows:

calculate SG$_{ha}$ to be SG$_{wv}$/((1−sh)·SG$_{wv}$+sh) if sh signal is valid and available and sh$_{default}$ if sh transmitter signal fault;

assume $x=igv_{act}/igv_{ref}$, $y=tnh_{act}/tnh_{ref}\cdot(tinlet_{ref}/tinlet_{act})^{0.5}$, and $z=tnh_{act}/tnh_{ref}\cdot(tinlet_{ref}/tinlet_{act})$;

$f_0=a_0\cdot y^3+b_0\cdot y^2+c_0\cdot y$, $f_1=a_1\cdot y^3+b_1\cdot y^2+c_1\cdot y$, $f_2=a_2\cdot y^3+b_1\cdot y^2+c_2\cdot y$, $f_3=a_3\cdot y^3+b_1\cdot y^2+c_3\cdot y$, $f4=a_{41}\cdot z^3+b_{41}\cdot z^2+c_{41}\cdot z+d_{41}$ if $tnh_{act}/tnh_{ref} \leq tnh_{threshold}$, and $a_{42}\cdot z^3+b_{42}\cdot z^2+c_{42}\cdot z+d_{42}$ if $tnh_{act}/tnh_{ref} > tnh_{threshold}$;

define Wair$_{act}$=SG$_{ha}$·pinlet$_{act}$/pinlet$_{ref}$·(f$_3$·x$^3$+f$_2$·x$^2$+f$_1$·x+f$_0$)·f$_4$·Wair$_{ref}$·k, evaluate Wexhaust$_{act}$=Wair$_{act}$·(1−IBH$_{fraction}$)·(1+fa$_{ratio\ ref}$·LHV$_{ref}$/LHV$_{act}$), calculate ρ$_{air}$=ρ$_{air\ ref}$·tamb$_{ref}$/tamb$_{act}$·pamb$_{act}$/pamb$_{ref}$, calculate Δp$_{exhaust}$=ρ$_{exhaust\ ref}$·ttx$_{ref}$/ttx$_{act}$·pamb$_{act}$/pamb$_{ref}$, calculate Δp$_{exhaust}$=a$_a$·ρ$_{exhaust}$·v$^2$−(ρ$_{air}$−ρ$_{exhaust}$)·Δh, and evaluate tpr=cpd/(pamb$_{act}$+Δp$_{exhaust}$), where cpd is the absolute compressor discharge pressure, which is measured in this application.

Thus, the ttxh curve 104 (see FIG. 6) is fully determined at this stage. If the temperature control curves for the gas turbine have been set up for a reference exhaust pressure drop Δp$_{exhaust\ ref}$ and reference inlet pressure drop Δp$_{inlet\ ref}$, it is possible to correct the temperature control curves for a different exhaust and inlet pressure drops, for example, the actual one, by using the correction Δttxh, as already discussed above.

One or more advantages of the temperature control logic described above are discussed now. Because the entire procedure developed above for controlling the gas turbine is matrix based, the procedure is flexible and allows for easy site tuning. The procedure may bias the controlled exhaust temperature, during normal and peak load operation, based on the actual fuel's LHV (or other fuel characteristics if differently specified). Based on this bias, it is possible to better control pollutant emission, combustion dynamics and combustor's turn down margins.

When the peak mode is enabled, the gas turbine may stay at normal firing temperature if the base load power is enough to cover the driven machine's power demand and the gas turbine may stay in over-firing if the base load power does not cover the driven machine's power demand. The peak firing value may be biased by the fuel characteristics. Based on this "smart" behavior, maintaining the peak mode always enabled, it is possible to configure the gas turbine to be more reactive in case of a variation of a modified Wobbe index (MWI) base load, and/or to undertake a larger load step up starting from any operating point (largest spinning reserve).

The MWI is given by LHV$_{gas}$/(SG$_{gas}$·T$_{gas}$)$^{0.5}$, with LHV$_{gas}$ being the lower heating value of the gas, SG$_{gas}$ the specific gravity of gas, and T$_{gas}$ the temperature of the fuel gas.

The above exemplary embodiments have described controlling a gas turbine based on a exhaust temperature reference curve. However, for an improved control of the gas turbine, other parameters and curves may be calculated. One such example, which is discussed next, is the primary to lean-lean mode transfer threshold curve ttxth.

Prior to calculating the ttxth curve, the modes of the gas turbine are discussed. However, for a better understanding of the modes, the following discussion about the gas turbine is believed to be appropriate. According to an exemplary embodiment, the combustor 40 shown in FIG. 2 may have the structure shown in FIG. 8. More specifically, combustor 40 may have a wall 110 that encloses primary burners 112 and at least a secondary burner 114. One or more secondary burners 114 may be used. Both primary and secondary burners 112 and 114 may be connected via corresponding fuel supply lines 116 and 118 to one or more fuel sources (not shown). The primary burner 112 injects the fuel to a primary region 120, in which the fuel in contact with a fluid (e.g., air, oxygen, etc.) supplied by compressor 32, are ignited, resulting in flames 124 produced in the primary region 120. The secondary burner 114 injects the fuel to a secondary region 126, where additional flames may be produced by the ignition of the additional fuel from the secondary burner 114 in the presence of the fluid from the compressor.

Figure 8:
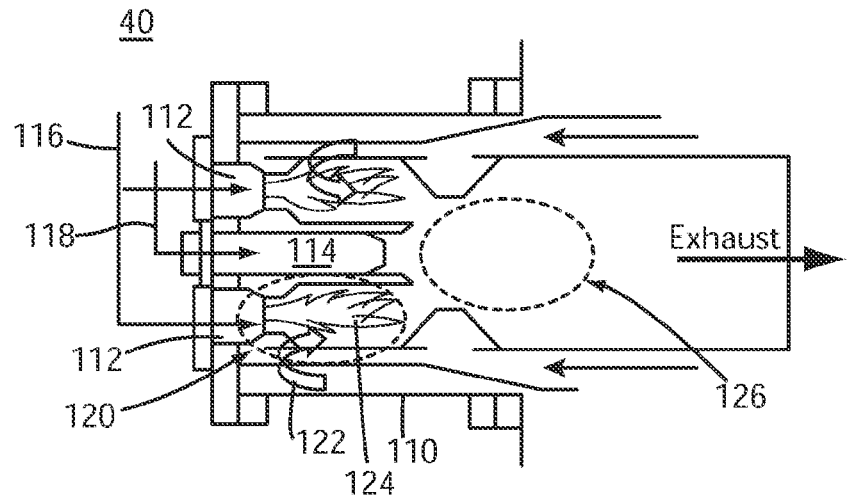
FIGS. 8-10 are schematic diagrams showing various operating modes of the gas turbine according to exemplary embodiments.

The modes of operation of the gas turbine may be grouped in main modes and sub modes. The main modes are characterized by the amount of fuel being supplied to the primary and/or secondary burners and the regions where the ignition takes place. The main modes are the primary mode, the lean-lean mode, and the premixed mode. Other modes may be defined and used depending on the application, the type of turbine, etc. The primary mode is illustrated in FIG. 8 and is characterized by more than half of the fuel being supplied to the primary burners 112 and most of the flames being present in the primary region 120. A small amount of fuel or no fuel is supplied to the secondary burner 114. In one application, the entire fuel is supplied to the primary burners and no fuel to the secondary burner. The primary mode is used while the gas turbine is started or loaded up to a first predetermined percentage of the base load. The first predetermined percentage depends with the application. In one exemplary embodiment, the first predetermined percentage is approximately 20% of the base load. The primary mode is a diffusion flame mode, i.e., the fuel is not premixed with an oxidant (e.g., air) prior to being ignited. This is in contrast with the premixed mode in which the fuel is premixed with the oxidant prior to being ignited. The lean-lean mode may include burners operating in the diffusion flame mode and burners operating in the premixed mode.

Figure 9:
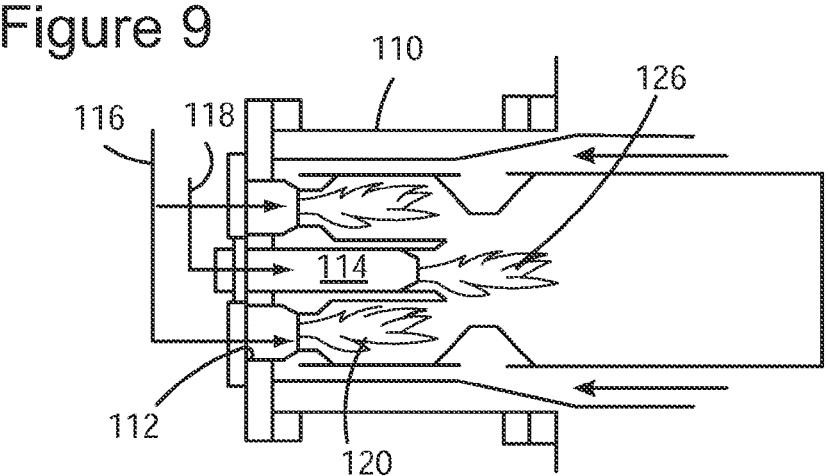

The gas turbine's operating mode changes to the lean-lean mode when the load increases over the first predetermined percentage and the load is between the first predetermined percentage and a second predetermined percentage. In one exemplary embodiment, the second predetermined percentage is 75% but can have different values depending on the application. Also, for the lean-lean mode, the secondary burner 114 is activated as shown in FIG. 9 and around 60% of the fuel is supplied to the primary burners and around 40% of the fuel is supplied to the secondary burner. However, the percentages are for illustrative purposes and they may change from application to application. For this mode, there are flames both in the primary region 120 and the secondary region 126.

Figure 10:
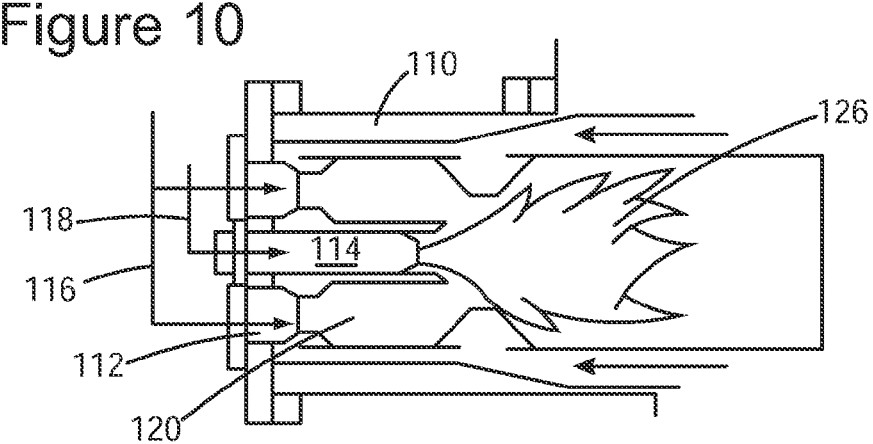

The gas turbine's mode further changes to the premixed mode when the load increases to a third predetermined percentage, which may be, for example, about 80% to 100%. At this stage, most of the fuel is provided to the primary burners 112 while the remaining of the fuel is provided to the secondary burner 114. However, it is noted that the flames have moved from the primary region 120 to the secondary region 126 as shown in FIG. 10. At this mode, the gas turbine operates with the lowest emissions, i.e., low NOx/CO pollutants.

The relevant sub modes of the main modes discussed above are as follows: (1) lean-lean pre-fill, (2) lean-lean transient, and (3) lean-lean steady state for the lean-lean mode and (1) premixed secondary, (2) premixed transient, and (3) premixed steady state for the premixed mode. Each mode and sub mode has specific conditions that trigger their activation. Only one mode of operation at a time can be active.

Next, it is discussed how to calculate the threshold curve ttxth for transitioning from primary mode to the lean-lean mode. The lean-lean to premixed mode transfer threshold are based on the ttxh curves calculated above with regard to FIGS. 5 and 6. The threshold curve ttxth is calculated similar to the reference ttxh curves, i.e., tamb, igv and tnh vectors are defined based on various ranges of these parameters, 3D matrices ttxtl, tprtl, ttxtr and tprtr, which identify the turbine exhaust temperatures and pressure ratios are generated, and the actual threshold curve ttxth is calculated based on equation ttxth=ttxtha+$\Delta$ttxth. It is noted that in terms of mathematical procedure, the difference between calculating ttxh and ttxth is the extra symbol "t". Thus, for this reason, the entire algorithm for calculating ttxth is not repeated again but it is assumed to be the one used for calculating ttxh. Although the algorithm used for calculating the ttxh and the ttxth curves is the same, the difference in values of these two curves is determined by the specific values of the 3D matrices ttxtl, tprtl, ttxtr and tprtr, i.e., ttxtl=[ttxtl$_{i,j,k}$] for lean fuel,
tprtl=[tprtl$_{i,j,k}$] for lean fuel,
ttxtr=[ttxtl$_{i,j,k}$] for rich fuel, and
tprtr=[tprtl$_{i,j,k}$] for rich fuel.

In addition, as discussed above with ttxh, other functions f may be used to calculate ttxth curves.

Similar to the $\Delta$ttxh correction, the $\Delta$ttxth correction is used to take into account the actual gas turbine's exhaust and inlet pressure drops. The gas turbine's temperature control curves refer to a reference exhaust pressure drop $\Delta p_{exhaust\ ref}$ and reference inlet pressure drop $\Delta p_{inlet\ ref}$. Similar to the reference curve ttxh, it is possible to correct the threshold curve ttxth for different exhaust and inlet pressure drops by using correction $\Delta$ttxth.

Figure 11:
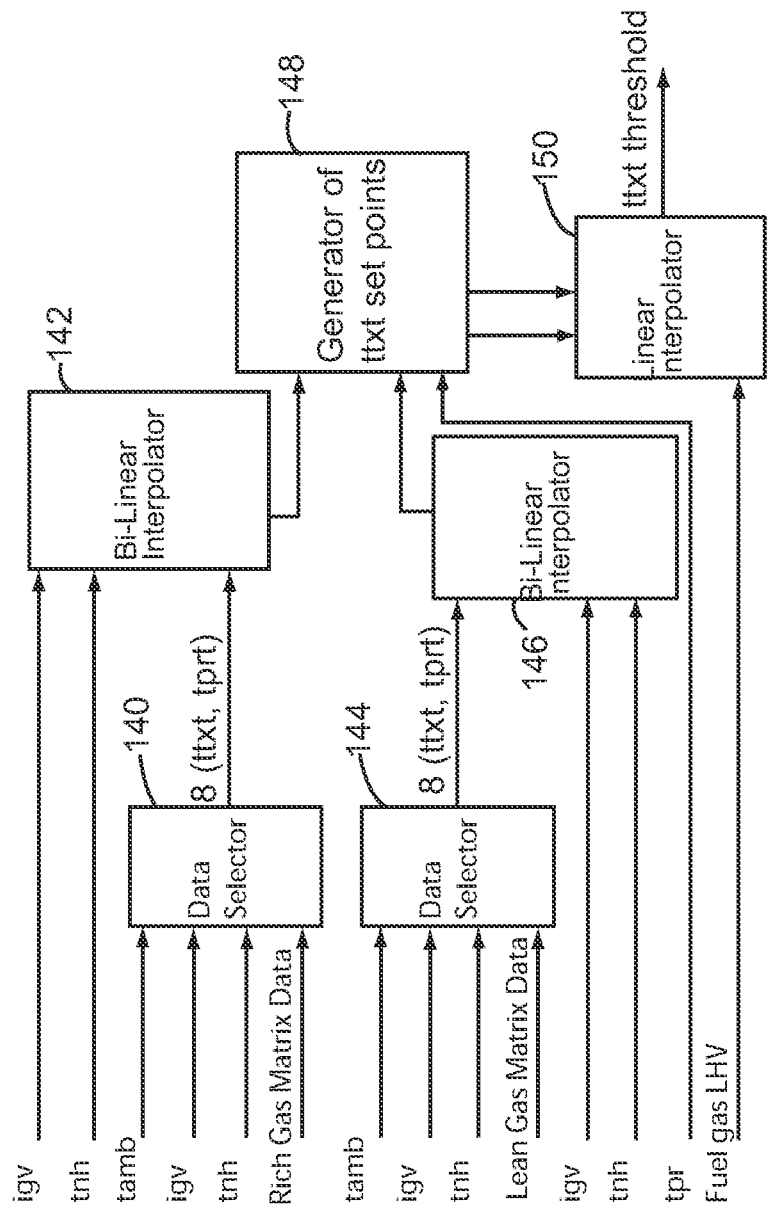
FIG. 11 is a flow chart illustrating a method for calculating a primary to lean-lean mode transfer threshold curve according to an exemplary embodiment.

According to an exemplary embodiment, a flow chart summarizing the calculations performed for determining $\Delta$ttxth is shown in FIG. 11. According to this figure, data selector unit 140 receives as input the ambient temperature tamb, the angle of rotation of the vanes IGV, the rotational speed tnh of the shaft and the rich gas matrix data (defined above with regard to ttxh). Eight points similar to C1 to C4 and D1 to D4 (shown in FIG. 5) are output by the data selector unit 140. Depending on the function selected, more or less points may be used. This output is provided as input to bi-linear interpolator unit 142. The same process is repeated by data selector unit 144 for the same parameters except that a lean gas matrix data is used instead of the rich gas matrix data. An output from data selector unit 144 is provided as input to interpolator unit 146. Output from interpolators 142 and 146, i.e., rich gas ttxth versus tprt actual control curve and lean gas ttxth versus tprt actual control gas are provided as input to calculation unit 148 for calculating two ttxth set points. Linear interpolator 150 receives the two ttxt set points and calculates the ttxth threshold of the gas turbine. It is noted that the linear interpolator 150 may receive directly information about the fuel gas LHV while the interpolator units 142 and 146 may directly receive igv and tnh data.

Having now the reference exhaust temperature ttxh curve determined as a function of the turbine pressure ratio tpr and the primary to lean-lean transfer threshold reference curve ttxth as a function of the turbine pressure ratio tpr, a mode transfer (change) of the gas turbine may be determined based on these curves and other information as discussed next. It is noted that the (ttx, tpr) plane has been used for determining both the ttxh curve and the ttxth curve, and thus, the entire discussion regarding the control of the gas turbine may be based on this plane.

Figure 12:
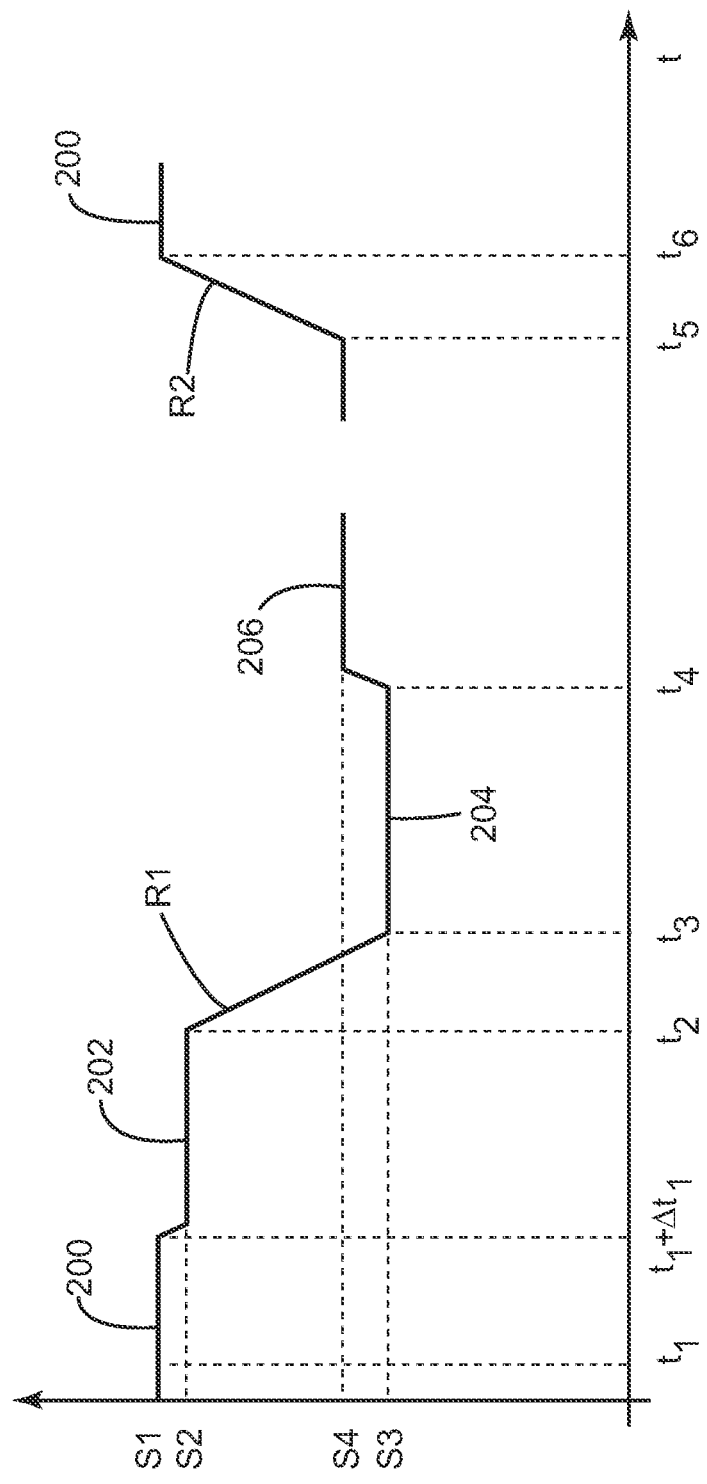
FIG. 12 is a graph showing a split fuel versus time for primary to lean-lean mode transfer according to an exemplary embodiment.

The primary to lean-lean and the lean-lean to primary mode transfers are triggered by the operating point of the gas turbine passing the ttxth curve in the (ttx, tpr) plane, which was discussed above with regard to FIGS. 5 and 6. According to an exemplary embodiment, the primary to lean-lean and lean-lean to primary transfer sequences are described with reference to FIG. 12. FIG. 12 illustrates a split S on the Y axis versus time t on the X axis. The split S is indicative of a percentage of the total fuel supplied to the combustor 40 (see FIG. 2) that is provided to the primary burners (see 112 in FIG. 8) and a percentage of the total fuel that is provided to the secondary burner (see 114 in FIG. 8). This percentage ratio is called split S. For example, a split S may be 40/60, i.e., 40% of the total fuel being provided to the primary burners and 60% of the total fuel being provided to the secondary burner.

With regard to FIG. 12, it is assumed that split S1 is provided by the controller to the gas turbine at a time t1. Suppose that at time t1, the ttx temperature (of the actual operating point) reaches the primary to lean-lean transfer threshold curve ttxth 220 shown in FIG. 13 and remains on or above it. The actual operating point is assumed to move on curve 222 prior to reaching the threshold curve ttxth 220. After a predetermined time interval of $\Delta t_1$ seconds from the beginning (t1) of this condition, if the condition persists, i.e., the actual operating time remains above or on the primary to lean-lean transfer threshold curve ttxth, the controller is configured to change the fuel split from S1 to S2. This change is happening gradually as shown in FIG. 12. According to an exemplary embodiment, the change from S1 to S2 may have a constant rate of change. The fuel split remains at such value S2 for a time interval until a second time t2. According to an exemplary embodiment, the time difference t2−t1 is precalculated.

When the fuel split is modified from S1 to S2, the gas turbine moves from the primary mode 200 to the lean-lean mode (202, 204, and 206). In other words, the primary mode 200 is characterized by S1 while the lean-lean mode is characterized, among other values, by S2. However, it is noted that the lean-lean mode has plural sub modes, each having its own fuel split S1. The fuel split S2 characterizes the lean-lean pre-fill sub mode 202. For simplicity, the sub modes are referred to as modes. A purpose of this mode is to purge away the air inside the manifold (combustor) and the flexible hoses by using the fuel gas, in order to make the transfer sequence between modes more stable.

At the time $t_2$, the pre-fill mode is complete and the controller is configured to change the fuel split from S2 to S3. S3 characterizes the lean-lean transient mode 204. The lean-lean transient mode 204 is maintained for the time interval t3-t4 in order to stabilize the flame in the secondary region shown in FIG. 8. Time interval t3-t4 is also precalculated. At the time t4 the controller changes the fuel split to S4, a steady state split value, which characterizes the lean-lean steady state mode 206. In one application, the split S3 may be defined as S3=S4+$\Delta S_1$, where A is a small variation, i.e., in the range of about 1 to 10%.

Figure 13:
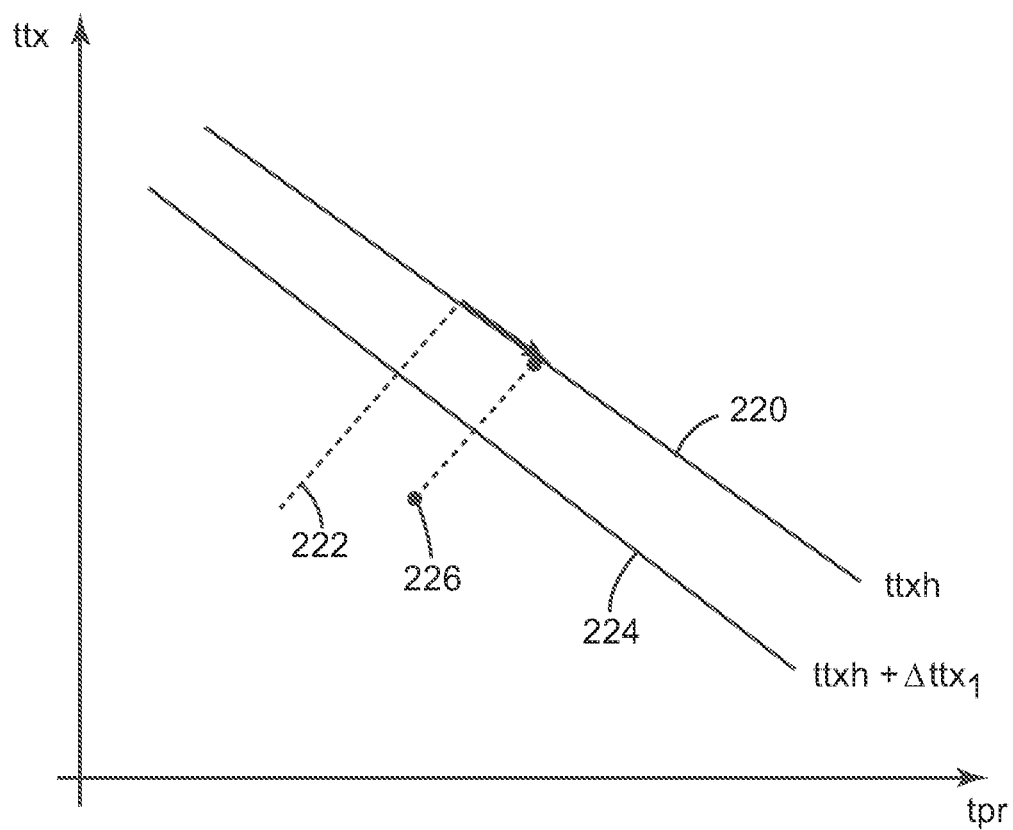
FIG. 13 is a graph showing a trajectory of an operating point of the turbine in a plane defined by exhaust temperature versus turbine pressure ratio according to an exemplary embodiment.

At time t5, when the ttx temperature of operating point 226 decreases below a ttxth+$\Delta$ttx$_1$ threshold curve 224 as shown in FIG. 13, the lean-lean to primary transfer is triggered and the split is changed by the controller from S4 to S1. $\Delta$ttx$_1$ is the exhaust temperature dead band for primary to lean-lean transfer threshold. The band defined by curves ttxth to ttxth+$\Delta$ttx$_1$ is used to prevent the quick change of the gas turbine back and forth between two modes as the exhaust temperature of the operating point may slightly vary in time above and/or below curve 220. The lean-lean transient 204 and the lean-lean steady state 206 modes (not the lean-lean pre-fill 202) may be aborted anytime the ttx temperature decreases below the ttxth+$\Delta$ttx$_1$ threshold curve 224.

As shown in FIG. 12, when the split is changed from $S_i$ to $S_j$, with $S_i$>$S_j$, an average split ramp rate is $R_1$, and when the split is changed from $S_k$ to $S_h$, with $S_k$<$S_h$, an average split ramp rate is $R_2$, different than $R_1$. These ramp rates may be constant and/or may depend with the final and initial values $S_i$ and $S_j$. According to an exemplary embodiment, when the primary to lean-lean transfer starts, an allowable exhaust temperature spread is increased by $\Delta SP_1$ (exhaust temperature spread increase over primary to lean-lean transfer) for $\Delta t_{pr \rightarrow 11}$ seconds, where "pr" represents primary, "11" represents lean-lean, and $\Delta t_{pr \rightarrow 11}$ represents time duration of the spread relaxation during primary to lean-lean transfer. The values of ramp rates $R_1$ and $R_2$, the split values $S_2$ and $S_4$ and the shift $\Delta S_1$ may be tuned during the shop/site tuning of the gas turbine.

According to an exemplary embodiment, which is not intended to limit the other exemplary embodiments, the following values may be used for the parameters discussed above. Split S1 in the primary mode may have a value of substantially 100%, split S2 in the lean-lean pre-fill mode may have a value of substantially 90%, split S4 in the lean-lean steady state may have a value of substantially 65%, split variation $\Delta S_1$ may have a value of substantially −3%, $\Delta SP_1$ may have a value of substantially 200 F, $\Delta t_1$ may be in the order of 3 s, $\Delta t_{pr \rightarrow 11}$ may be in the order of 60 s, and $\Delta$ttx$_1$ may be in the order of −25 F. The term substantially is used here to indicate that the actual values may be off the stated values by an amount that depends on the application without departing from the intended scope.

Figure 14:
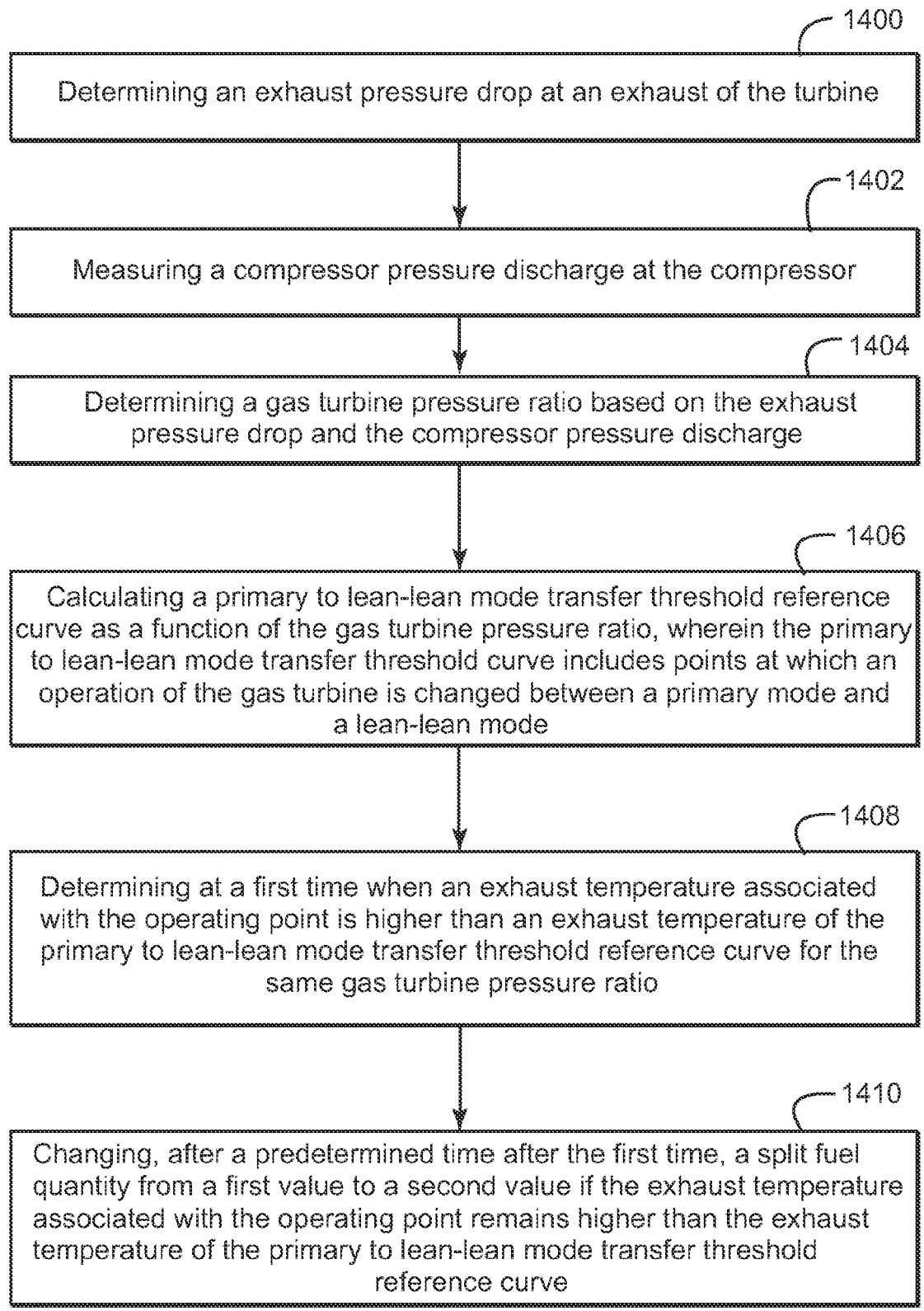
FIG. 14 is a flow chart illustrating a method for calculating a transfer from primary to lean-lean modes according to an exemplary embodiment.

Thus, based on the above discussed exemplary embodiments that relate to the primary to lean-lean and lean-lean to primary mode transfers, it is possible to control the operating point of the gas turbine such that both the mode and a split fuel are controlled. More specifically, according to an exemplary embodiment illustrated in FIG. 14, a method for controlling an operating point of a gas turbine that includes a compressor, a combustor and at least a turbine is provided. The method comprises determining an exhaust pressure drop at an exhaust of the turbine 1400, measuring a compressor pressure discharge at the compressor 1402, determining a turbine pressure ratio based on the exhaust pressure drop and the compressor pressure discharge 1404, calculating a primary to lean-lean mode transfer threshold reference curve as a function of the turbine pressure ratio 1406, where the primary to lean-lean mode transfer threshold curve includes points at which an operation of the gas turbine is changed between a primary mode and a lean-lean mode, determining at a first time when an exhaust temperature associated with the operating point is higher than an exhaust temperature of the primary to lean-lean mode transfer threshold reference curve for the same turbine pressure ratio 1408, and changing, after a predetermined time after the first time, a split fuel quantity from a first value to a second value if the exhaust temperature associated with the operating point remains higher than the exhaust temperature of the primary to lean-lean mode transfer threshold reference curve 1410.

The primary mode is defined in this embodiment as providing most of the fuel to primary burners and providing a remaining or no fuel to a secondary burner of the combustor and also igniting the provided fuel in a primary region of the combustor, the primary region being adjacent to the secondary region, and the lean-lean mode is defined as providing fuel to both the primary burners and the secondary burner and burning the provided fuel both in the primary region and the secondary region. The split fuel quantity describes in percentages a first amount of the total fuel that is received by the primary burners and a second amount of the total fuel that is received by the secondary burner.

Figure 15:
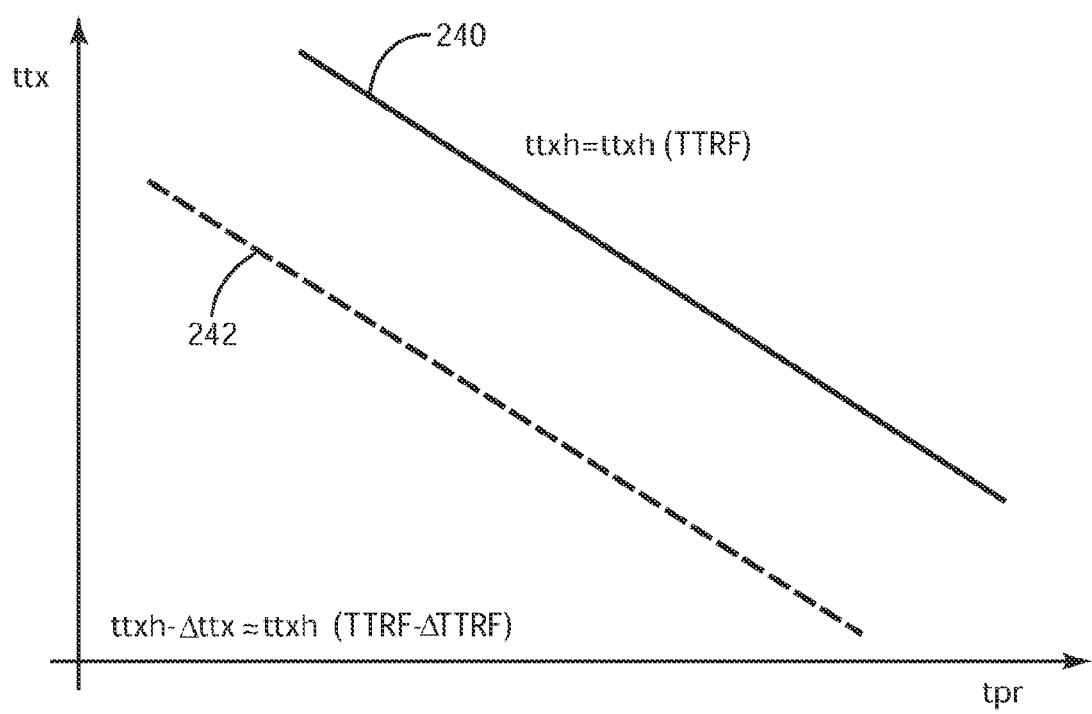
FIG. 15 is a graph showing an exhaust temperature band for a lean-lean to premixed mode transfer according to an exemplary embodiment.

While the gas turbine is operated on exhaust temperature control via IGV's, the locus of the exhaust temperature set points is represented by the TTRXGV temperature control curve discussed above. In the plane (ttx, tpr) illustrated in FIGS. 5 and 6, and as shown in FIG. 15, lowering the curve ttxh 240 by $\Delta$ttx to curve 242 is equivalent to lowering the firing temperature by $\Delta$TTRF. In other words, curves 240 and 242 in FIG. 15 shows a correspondence between ttxh and the firing temperature TTRF.

Therefore, a dead band between curves 240 and 242 in the (ttx, tpr) plane can replace a traditional firing temperature dead band. A dead band is used in this disclosure to define a part of the plane in which no action is taken even if a given parameter passes the band. Based on this fact, the lean-lean to premixed transfer sequences are described now with regard to FIG. 16.

Consider that the gas turbine operates in the lean-lean steady state mode 206 (see FIG. 16) at a time prior to time t7. The split fuel S for this mode is S4, similar to the one discussed above with regard to FIG. 12. The lean-lean steady state mode 206 to premixed secondary 250 transfer sequence is initiated at time t7 and the fuel split is changed from S4 to S5. The transfer starts when the logic "AND" of the following conditions is TRUE for at least $\Delta t_2$ seconds:

$$IGV_{min}+\Delta IGV_1 \leq IGV_{set\ point} \leq IGV_{max}+\Delta IGV_2,$$

$$ttx \geq ttxh+\Delta ttx_3,$$

"premixed_mode_set"=TRUE, and

"premixed_mode_enable"=TRUE, where $\Delta IGV_1 > 0$, $\Delta IGV_2 < 0$, $\Delta ttx_3 < 0$, and $IGV_{set\ point}$ is a point that may be calculated continuously or periodically by a controller and is a target for the IGV vanes.

Figure 17:
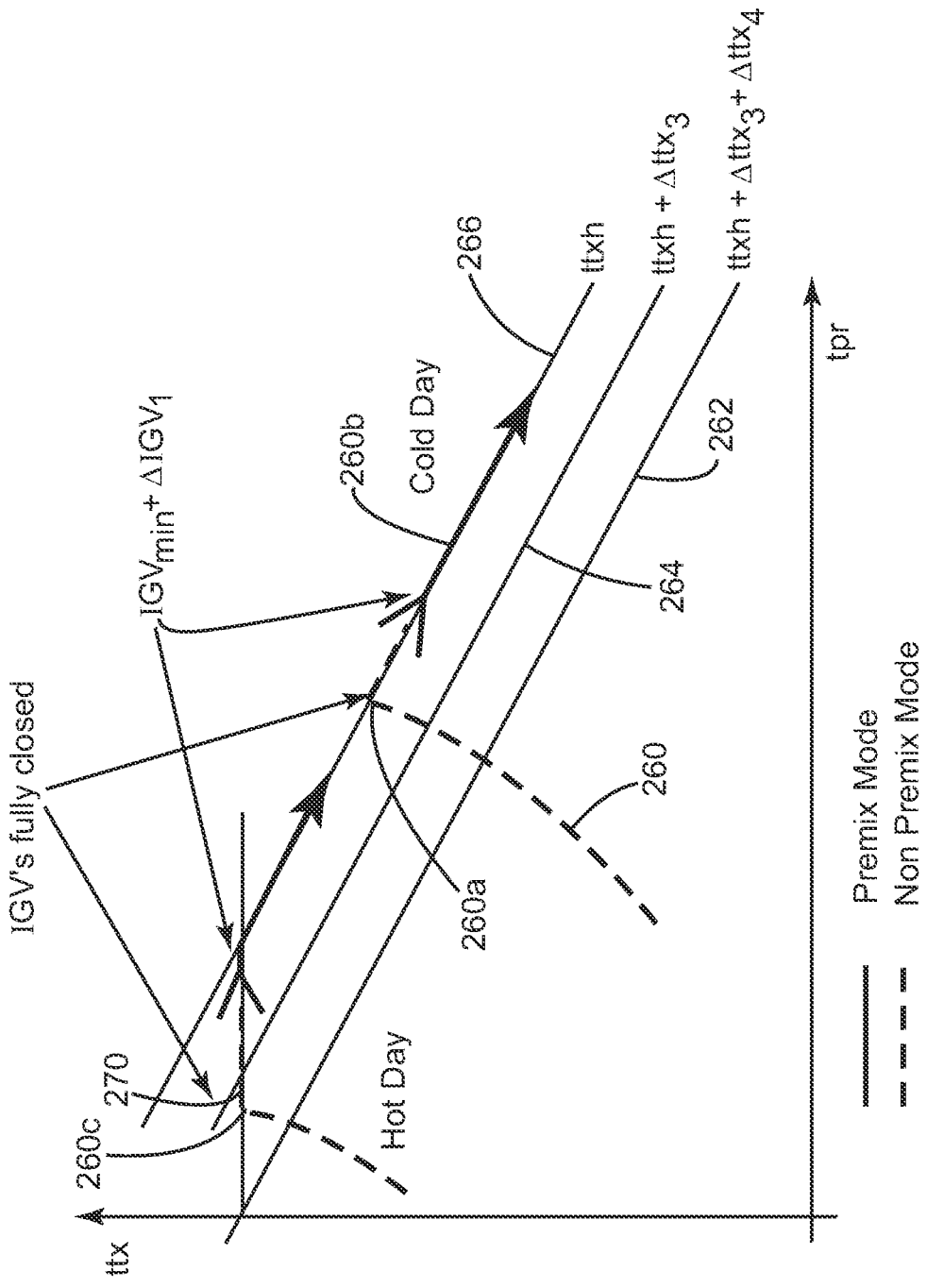
FIG. 17 is a graph showing a change of an operating point of a turbine when changing from lean-lean to premixed operation according to an exemplary embodiment.

The meaning of the above parameters and equations are discussed now with regard to FIG. 17. Suppose that an operating point of the gas turbine is 260, as shown in FIG. 17. Suppose that there is a cold day, i.e., an ambient temperature less than 10° C. By adjusting the IGV angle of the compressor, the operating point 260 (which represents the actual exhaust temperature) may cross curve 264 to arrive on ttxh curve 266, which is desired for the operation of the gas turbine. Curve 264 is offset from ttxh curve 266 by a value $\Delta ttx_3$, which is an exhaust temperature dead band for the lean-lean to premixed transfer threshold and may have a value around −12.5 F. Curve 262, which is discussed later, is offset from ttxh curve 266 by $\Delta ttx_3$ and $\Delta ttx_4$, which is an exhaust temperature dead band from lean-lean to premixed transfer threshold.

When the operating point reaches position 260a on ttxh 266, the IGVs are fully closed. By opening the IGVs to a value $IGV_{min} + \Delta IGV_1$, the operating point of the gas turbine moves to position 260b. $\Delta IGV_1$ range is used to reduce the firing temperature swing due to the instability introduced by the lean-lean to premixed transfer sequence, because the IGV maintains the firing temperature while controlling the gas turbine exhaust temperature. $\Delta IGV_2$ prevents the lean-lean to premixed transfer at a high load. A similar behaviour of the operating point 260 takes place for a hot day with the exception that prior to passing curve 264, the operating point 260c reaches a point from which the ttx temperature cannot increase and the operating point evolves on an isothermal curve 270 prior to reaching ttxh curve 266.

Figure 16:
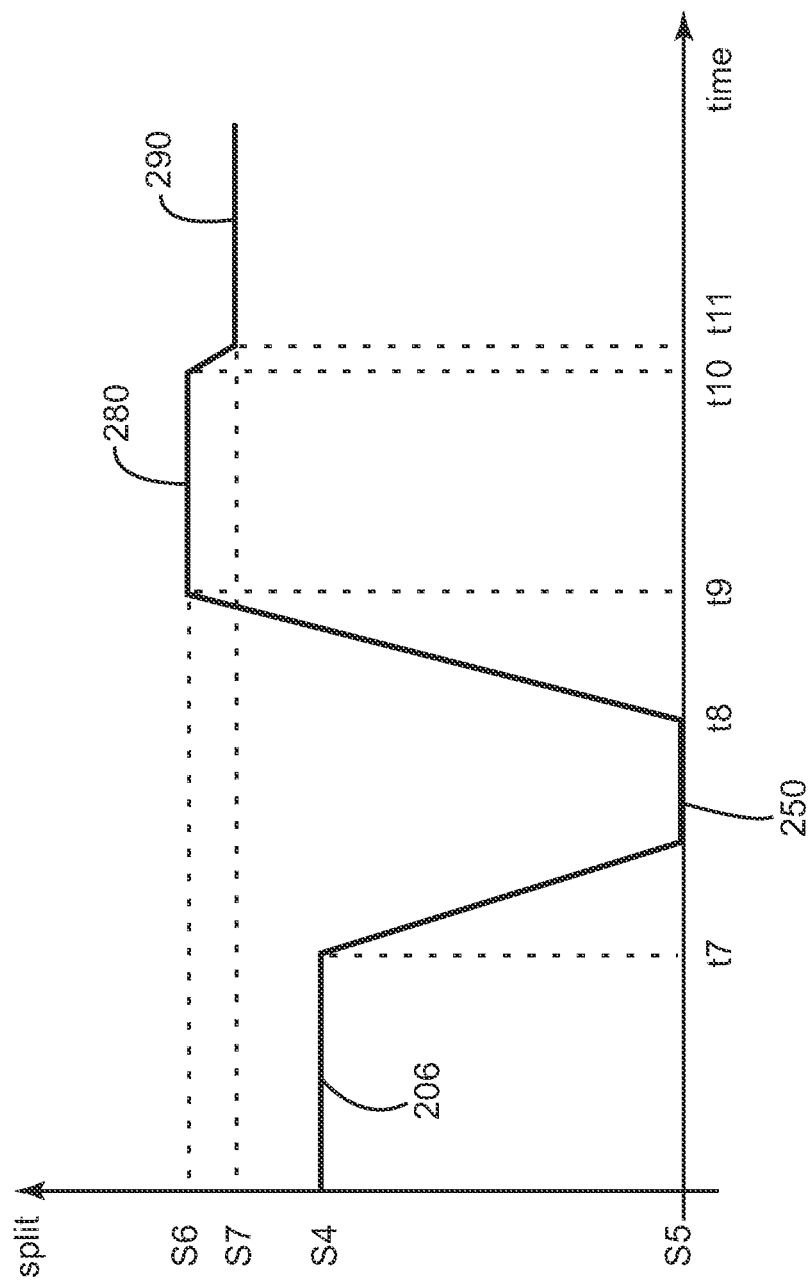
FIG. 16 is a graph showing a split fuel versus time for lean-lean to premixed mode transfer according to an exemplary embodiment.

The premixed secondary mode 250 in FIG. 16 is changed either when it is detected that the primary flame is not present (see for example FIG. 10) and this determination starts the premixed secondary 250 to premixed transient 280 sub-sequence at time t8, or when a predetermined maximum time duration for the premixed secondary mode 250 has been reached.

When the premixed secondary mode 250 terminates, the fuel split is changed from S5 to S6 as shown in FIG. 16. The fuel split S6 characterizes the premixed transient 280. The premixed transient mode 280 is maintained for a predetermined time $\Delta t_3$, for example, about 5 s, and then the premixed transient mode 280 is terminated at time t10 in FIG. 16. The premixed transient mode 280 is used to stabilize the flame in the secondary zone 126 in FIG. 10. A premixed steady state 290 is initiated at time t11 and this mode has a fuel split value S7. The fuel split value S6 of the premixed transient mode 280 is calculated based on the fuel split value S7 of the premixed steady state 290 and may have the value $S6 = S7 + \Delta S_2$, with $\Delta S_2$ being in one embodiment about −2%.

When the premixed transient mode 280 terminates at time t10, the controller controls the gas turbine to enter the premixed steady state mode 290, thus changing the fuel split value from S6 to S7. The fuel split value S7 is expected to depend on the actual reaction conditions, which are related to the fuel's characteristics, the reaction temperature and the induction time. The reaction temperature is a temperature at which combustion takes place close to the completion phase and the induction time is a time spent to produces intermediate chemical substances (radicals) which are the promoter of the fast reaction (fast reaction is usually called "flame"), starting from the reactants mixing.

According to an exemplary embodiment, the fuel split S7 may be set to achieve a desirable compromise between emissions, dynamics and stability. This compromise value may be given by the following formula, which is not intended to limit the exemplary embodiments:

$S7 = \text{split} = \text{splithr} \cdot (LHV - LHVl)/(LHVr - LHVl) + \text{splithl} \cdot (LHVr - LHV)/(LHVr - LHVl) + \Delta\text{split}$, where LHV is the lower heating value of the actual fuel,
LHVl is the lower heating value of the lean fuel,
LHVr is the lower heating value of the rich fuel,
splithr = LinearInterpolation(splitr, igv),
splithl = LinearInterpolation(splitl, igv), and
igv is the actual IGV angle.

According to an exemplary embodiment, splitr and splitl matrices may be defined as

| splitr | | | | | |
|---|---|---|---|---|---|
| $igv_1$ | $igv_2$ | $igv_3$ | $igv_4$ | $igv_5$ | $igv_6$ |
| $splitr_1$ | ... | $splitr_3$ | ... | ... | $splitr_6$ |

| splitl | | | | | |
|---|---|---|---|---|---|
| $igv_1$ | $igv_2$ | $igv_3$ | $igv_4$ | $igv_5$ | $igv_6$ |
| $splitl_1$ | ... | $splitl_3$ | ... | ... | $splitl_6$ |

$\Delta\text{split} = \text{LinearInterpolation}(\Delta\text{split}, \Delta ttx_5, igv)$,

| | Δsplit | | | | | |
|---|---|---|---|---|---|---|
| | $igv_1$ | $igv_2$ | $igv_3$ | $igv_4$ | $igv_5$ | $igv_6$ |
| $\Delta ttx_{5,1}$ | $\Delta split_{1,1}$ | ... | ... | ... | ... | ... |
| $\Delta ttx_{5,2}$ | $\Delta split_{2,1}$ | ... | ... | ... | ... | ... |
| $\Delta ttx_{5,3}$ | $\Delta split_{3,1}$ | ... | ... | ... | ... | ... |
| $\Delta ttx_{5,4}$ | $\Delta split_{4,1}$ | ... | $\Delta split_{3,4}$ | ... | ... | $splitl_{6,4}$ | with $\Delta ttx_5 = ttxh - ttx$.

In case the LHV signal is not available, for example, calorimeter fault or calibration fault, a value $(LHVr + LHVl)/2$ may be used instead of the actual value. Other values may be used depending on the application. According to an exemplary embodiment, the premixed mode (which includes the premixed secondary, premixed transient and premixed steady state) may be aborted anytime the conditions for the premixed to lean-lean or extended lean-lean are met. In one application, when the fuel split quantity is changed from $S_i$ to $S_j$, with $S_i > S_j$, a split ramp rate may be $R_3$. In another application, when the fuel split quantity is changed from $S_k$ to $S_h$, with $S_k < S_h$, a split ramp rate may be $R_4$. Still in another application, the split ramp rates may depend on the final and initial values of the fuel split quantity.

According to an exemplary embodiment, when the lean-lean to premixed transfer starts, the allowable exhaust temperature spread is increased by $\Delta SP_2$ for $\Delta t_{11 \to pm}$ seconds. A value of $\Delta SP_2$ may be around 200 F and a value of $\Delta t_{11 \to pm}$ may be around 60 s. The ramp rates $R_3$ and $R_4$, the split values S7 and the shift $\Delta S_2$ may be adjusted as desired by the operator of the gas turbine during turbine tuning.

Next, the opposite process is discussed, i.e., the premixed to lean-lean mode transfer. As a lean-lean extended mode may be defined as being equivalent to the lean-lean mode but operated in a gas turbine operating range where the premixed mode works properly, a transition from the premixed to the lean-lean extended mode is similar to the transition from the premixed to the lean-lean mode. For this reason, only the transition from premixed to lean-lean is discussed next. The premixed to lean-lean transfer is initiated when the logic OR of the following conditions is TRUE for at least $\Delta t_4$ seconds:

$IGV_{set point} \leq IGV_{min}$ $ttx \leq ttxh + \Delta ttx_3 + \Delta ttx_4$

"primary reignition"=TRUE

"premixed_mode_enable"=FALSE with $\Delta ttx_4 < 0$. The premixed mode can be enabled/disabled by the operator. Thus, the premix_mode_enable is a logical variable that may be used to control this mode of the turbine.

Figure 18:
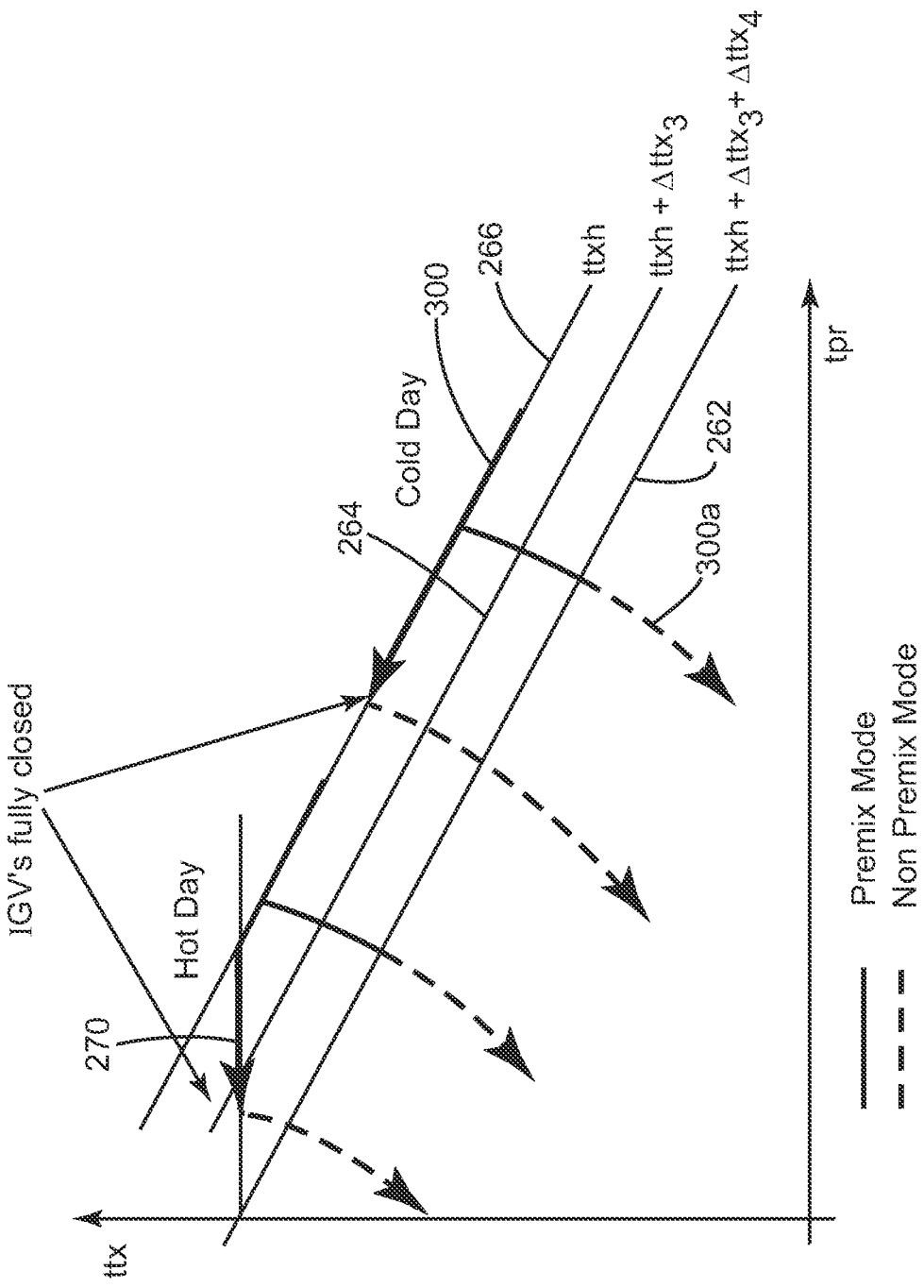
FIG. 18 is a graph showing a change of an operating point of a turbine when changing from premixed to lean-lean operation according to an exemplary embodiment.

With regard to FIG. 18, an operating point 300 of the gas turbine may be on the ttxh curve 266. When the OR logic above happens, the operating point 300 moves to a new position 300a. This transition may happen when a load requested from the gas turbine is decreasing. When the operating point passes curve 262, which was discussed above, the transfer from the premixed mode to the lean-lean mode is triggered. This transfer may happen for a cold day or a hot day, with a difference between the cold and hot days being that the operating point for the hot day may move along an isothermal curve 270, similar to that described in FIG. 17. It is noted that the threshold curve 262 for changing the premixed mode to the lean-lean mode may be different from the threshold curve 264 for changing from the lean-lean mode to the premixed mode.

Figure 19:
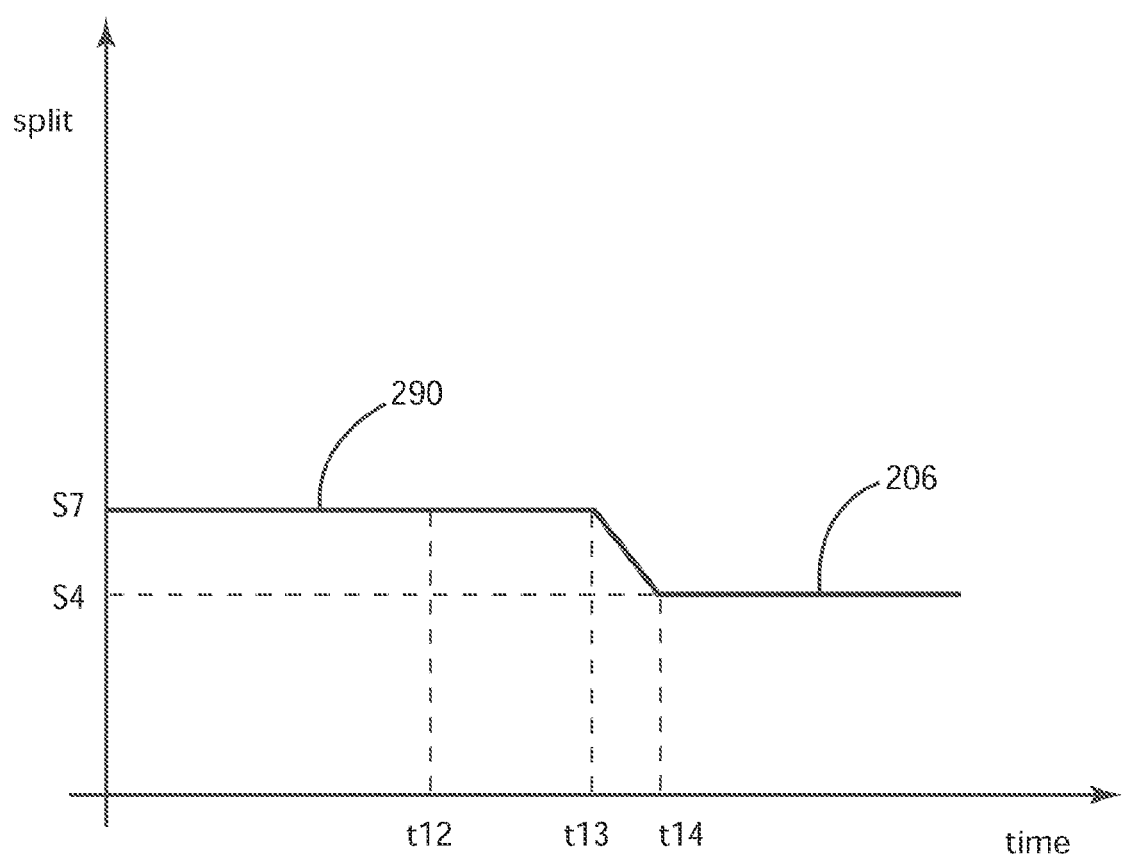
FIG. 19 is a graph showing a split fuel versus time for premixed to lean-lean mode transfer according to an exemplary embodiment.

Assuming that the mode transfer between the premixed mode 290 and the lean-lean mode 206 (or other lean-lean sub modes) takes place at time t12 as shown in FIG. 19, spark plugs (not shown) of the combustor are activated to reignite the fuel. If a primary re-ignition is detected at time t13, the fuel split is changed from S7 to S4 with an average ramp rate $R_5$.

If the primary re-ignition is not detected within $\Delta t_5$ seconds, the gas turbine is configured to trip. The premixed mode 290 transfer-out (both to lean-lean and to extended lean-lean) resets the "premixed_mode_set" condition to FALSE in the controller. The "premixed_mode_set" is set again to TRUE when the logic AND of the following conditions is TRUE for at least $\Delta t_6$ seconds:

$IGV_{set point} \leq IGV_{min}$, and $ttx \leq ttxh + \Delta ttx_3 + \Delta ttx_4$.

This mechanism is configured to prevent the continuous premixed transfer-in and transfer-out in case of large gas turbine power fluctuations.

After a time interval of $\Delta t_7$ seconds after the "premixed_mode_set" has been reset to FALSE, the gas turbine operator is enabled to set it to TRUE again. This configuration allows the operator to prepare the gas turbine for entering again the premixed mode, thus avoiding reducing the load of the gas turbine required by the existing algorithms (IGV's full closure).

According to an exemplary embodiment, the following numerical values may be used for the various time intervals discussed above. $\Delta t_4$ may have a value of about 0.5 s, $\Delta t_5$ may have a value of about 8 s, $\Delta t_6$ may have a value of about 5 s, and $\Delta t_7$ may have a value of about 10 s.

Figure 20:
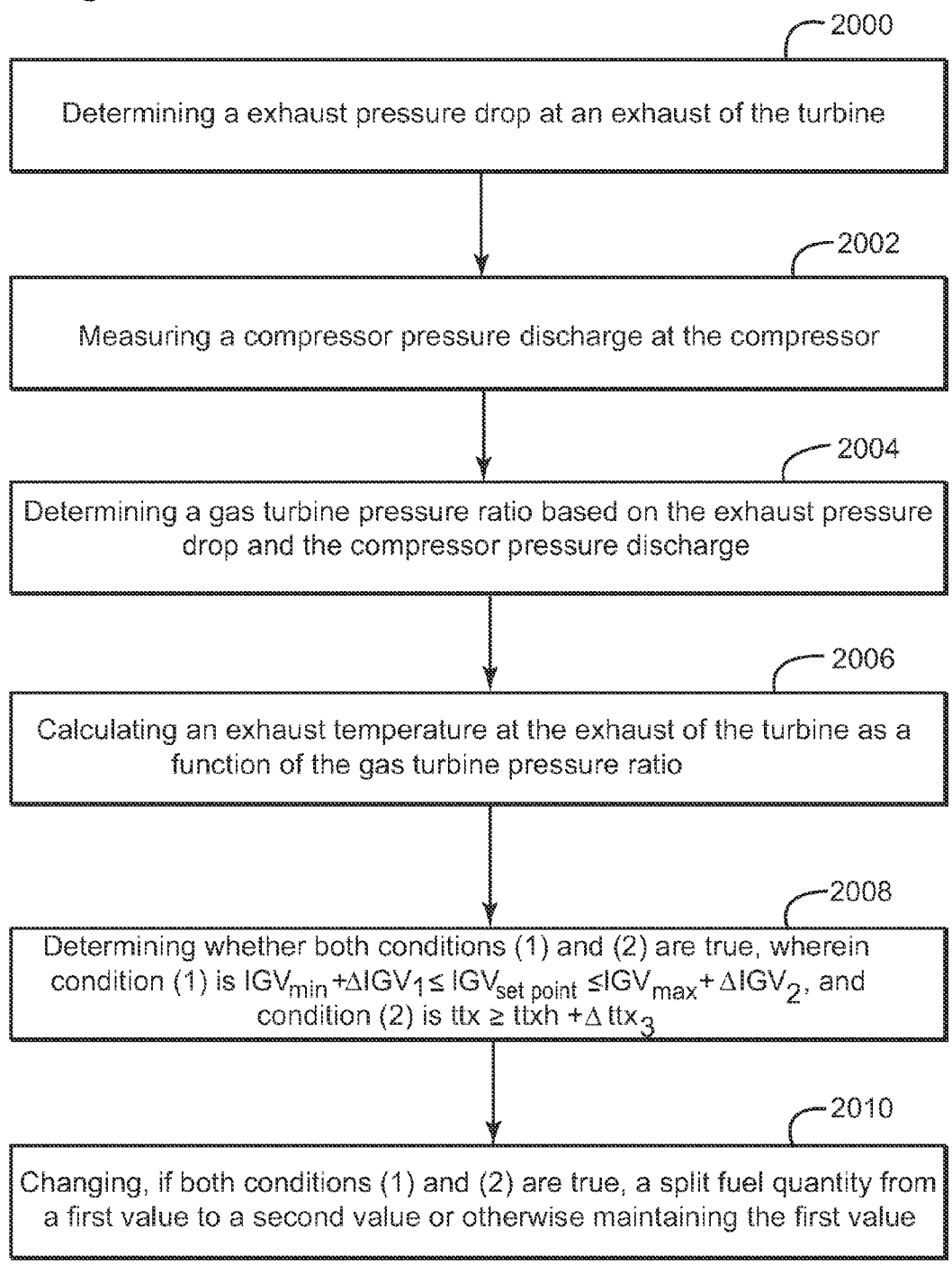
FIG. 20 is a flow chart illustrating a method for calculating a transfer from lean-lean to premixed modes according to an exemplary embodiment.

According to an exemplary embodiment illustrated in FIG. 20, a method for controlling an operating point of a gas turbine that includes a compressor, a combustor and at least a turbine is provided. The method comprises determining an exhaust pressure drop at an exhaust of the turbine 2000, measuring a compressor pressure discharge at the compressor 2002, determining a turbine pressure ratio based on the exhaust pressure drop and the compressor pressure discharge 2004, calculating an exhaust temperature at the exhaust of the turbine as a function of the turbine pressure ratio 2006, determining whether both conditions (1) and (2) are true 2008, wherein condition (1) is $IGV_{min} + \Delta IGV_1 \leq IGV_{set point} \leq IGV_{max} + \Delta IGV_2$, and condition (2) is $ttx \geq ttxh + \Delta ttx_3$, with $IGV_{set point}$ being a predetermined angle of inlet guide vanes (IGV) provided at an inlet of the compressor, $IGV_{min}$ is a minimum value for the IGV, $IGV_{max}$ is a maximum value for the IGV, $\Delta IGV_1$ is a first predetermined positive IGV angle increase for lean-lean to premixed transfer, $\Delta IGV_2$ is a second predetermined negative IGV angle increase for lean-lean to premixed transfer, ttx is a current exhaust temperature, ttxh is an exhaust temperature reference curve, and $\Delta ttx_3$ is a predetermined negative temperature characterizing an exhaust temperature dead band for lean-lean to premixed transfer, and changing, if both conditions (1) and (2) are true, a split fuel quantity from a first value to a second value or otherwise maintaining the first value, the first value characterizing a lean-lean steady state mode and the second value characterizing a premixed secondary mode of a premixed mode 2010. The premixed mode is defined as providing fuel to primary burners and to a secondary burner of the combustor and igniting the provided fuel in a secondary region of the combustor while primary regions are free of flames, the primary regions being adjacent to the secondary region, the lean-lean mode is defined as providing fuel to both the primary burners and the secondary burner and igniting the provided fuel both in the primary regions and the secondary region, and the split fuel quantity describes in percentages a first amount of the total fuel that is received by the primary burners and a second amount of the total fuel that is received by the secondary burner.

According to an exemplary embodiment, the exhaust temperature reference curve ttxh, the exhaust temperature threshold curve ttxth and other curves represented in plane (ttx, tpr) may be calculated based on other parameters that characterize a fuel instead of the lower heating value (LHV). Such parameters may be, for example, a NOx (oxides of Nitrogen) factor, an upper to lower flammability ratio (a lower flammability limit is the smallest percentage of combustible in a given volume of a mixture of fuel and air (or other oxidant) that supports a self propagating flame and an upper flammability limit is the highest percentage of the combustible in the given volume that supports a self propagating flame), etc. In other words, ttxh curve has been calculated in an exemplary embodiment discussed above as being ttxh=ttxha+$\Delta$ttxh, where ttxha=ttxhr·(LHV−LHV1)/(LHVr−LHV1)+ttxhl· (LHVr−LHV)/(LHVr−LHV1). However, the ttxha depends on the lower heating value LHV of the fuel and not from, for example, the NOx factor, the upper to lower flammability ratio, etc.

Thus, if a gas turbine is fed sequentially with first and second fuels, which have the same MWI index but different NOx factors, the algorithm discussed above for calculating the ttxh is not sensitive to the NOx factor as this factor is not part of the ttxha function. As the MWI factor depends from the LHV, which is reflected in the formula for the ttxha, ttxha and implicitly the ttxh curve are influenced by a change in the MWI index of the fuel. However, as the first and second fuels have similar MWI indexes, the ttxh curve and other curves based on the LHV variable will not be able to "see" that different fuels are provided to the gas turbine.

For this reason, according to an exemplary embodiment, the ttxh, ttxth, and other curves may be calculated as a function of the NOx factor, the upper to lower flammability ratio, or other parameters characteristics for a fuel. In one application, the same mathematical functions and algorithm may be used to calculate the new ttxh, ttxth curves but with the LHV parameter replaced by the new parameter. However, other functions and/or algorithms may be used to calculate the ttxh, ttxth and other curves based on the NOx factor, the upper to lower flammability ratio, etc. In other words, the controller 70 may be configured to calculate the desired curves in multiple (ttx, tpr) planes, each corresponding to a given fuel parameter.

According to an exemplary embodiment, the controller may be configured to use a parameter indicative of a characteristic of the fuel to determine the exhaust temperature reference curve. The parameter, as discussed above, may be one of a lower heating value of the fuel, a NOx factor of the fuel, an upper to lower flammability ratio of the fuel, or a combination thereof. Further, the controller may be configured to calculate exhaust temperature reference curves based on a corresponding parameter, for example, three reference curves for the three noted parameters, and to select one of the calculated exhaust temperature reference curves and control the gas turbine based on the selected exhaust temperature reference curve (the NOx factor based reference curve for the example discussed above).

Figure 21:
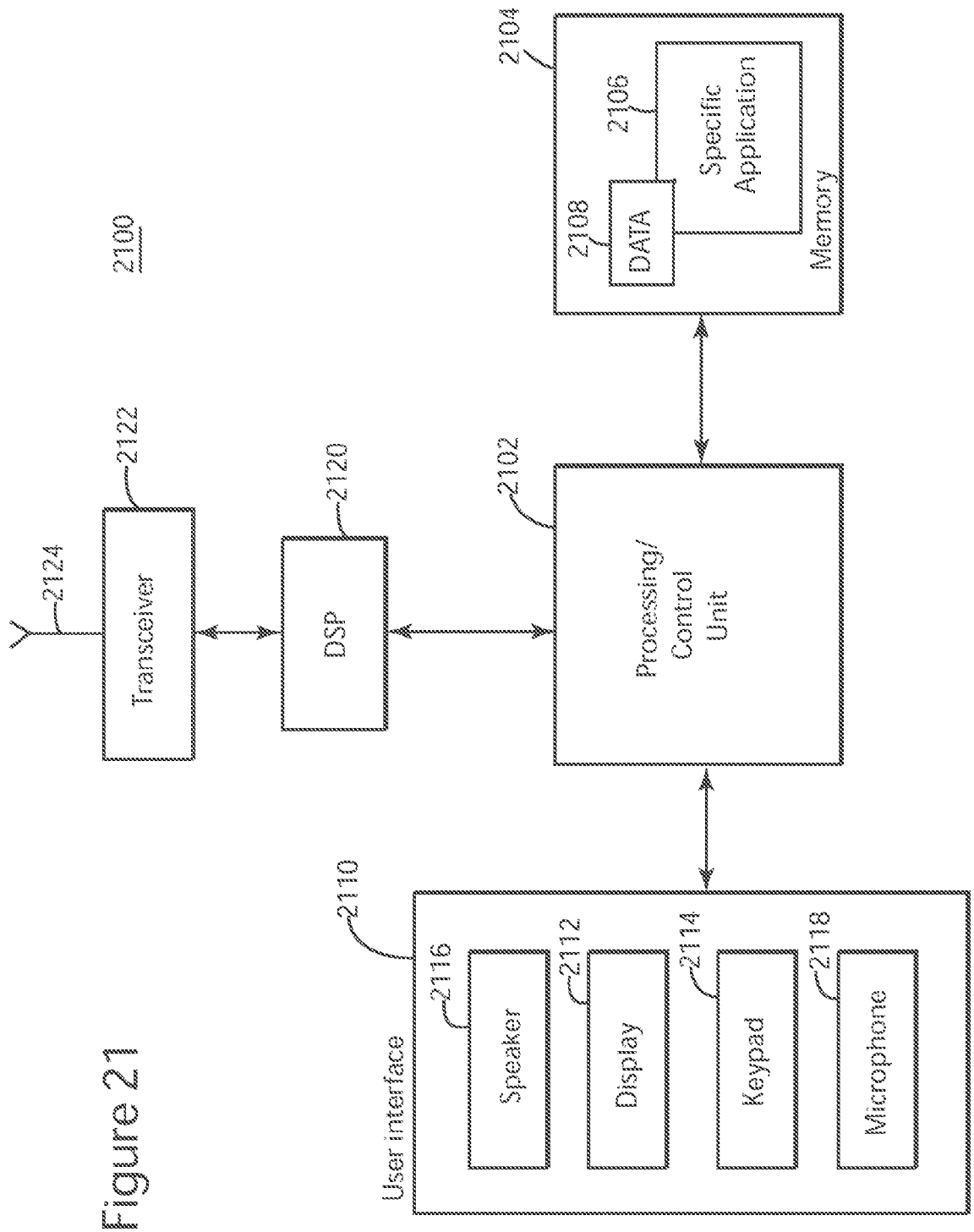
FIG. 21 is a schematic diagram of a controller used to control the turbine.

For purposes of illustration and not of limitation, an example of a representative controller 2100 capable of carrying out operations in accordance with the exemplary embodiments is illustrated in FIG. 21. The controller 70 discussed above with regard to FIG. 2 may have the structure of controller 2100. It should be recognized, however, that the principles of the present exemplary embodiments are equally applicable to a processor, computer system, etc.

The exemplary controller 2100 may include a processing/control unit 2102, such as a microprocessor, reduced instruction set computer (RISC), or other central processing module. The processing unit 2102 need not be a single device, and may include one or more processors. For example, the processing unit 2102 may include a master processor and associated slave processors coupled to communicate with the master processor.

The processing unit 2102 may control the basic functions of the system as dictated by programs available in the storage/memory 2104. Thus, the processing unit 2102 may execute the functions described in FIGS. 14 and 20. More particularly, the storage/memory 2104 may include an operating system and program modules for carrying out functions and applications on the controller. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. The program modules and associated features may also be transmitted to the controller 2100 via data signals, such as being downloaded electronically via a network, such as the Internet.

One of the programs that may be stored in the storage/memory 2104 is a specific program 2106. As previously described, the specific program 2106 may store relevant parameters of the gas turbine and also may include instructions for calculating the primary to lean-lean mode transfer threshold curve and sending instructions to close or open IGV, etc. The program 2106 and associated features may be implemented in software and/or firmware operable by way of the processor 2102. The program storage/memory 2104 may also be used to store data 2108, such as the relevant parameters of the gas turbine, or other data associated with the present exemplary embodiments. In one exemplary embodiment, the programs 2106 and data 2108 are stored in non-volatile electrically-erasable, programmable ROM (EEPROM), flash ROM, etc. so that the information is not lost upon power down of the controller 2100.

The processor 2102 may also be coupled to user interface 2110 elements associated with a control station in a power plant. The user interface 2110 of the power plant may include, for example, a display 2112 such as a liquid crystal display, a keypad 2114, speaker 2116, and a microphone 2118. These and other user interface components are coupled to the processor 2102 as is known in the art. The keypad 2114 may include alpha-numeric keys for performing a variety of functions, including dialing numbers and executing operations assigned to one or more keys. Alternatively, other user interface mechanisms may be employed, such as voice commands, switches, touch pad/screen, graphical user interface using a pointing device, trackball, joystick, or any other user interface mechanism.

The controller 2100 may also include a digital signal processor (DSP) 2120. The DSP 2120 may perform a variety of functions, including analog-to-digital (A/D) conversion, digital-to-analog (D/A) conversion, speech coding/decoding, encryption/decryption, error detection and correction, bit stream translation, filtering, etc. The transceiver 2122, generally coupled to an antenna 2124, may transmit and receive the radio signals associated with a wireless device.

The controller 2100 of FIG. 21 is provided as a representative example of a computing environment in which the principles of the present exemplary embodiments may be applied. From the description provided herein, those skilled in the art will appreciate that the present invention is equally applicable in a variety of other currently known and future mobile and fixed computing environments. For example, the specific application 2106 and associated features, and data 2108, may be stored in a variety of manners, may be operable on a variety of processing devices, and may be operable in mobile devices having additional, fewer, or different supporting circuitry and user interface mechanisms. It is noted that the principles of the present exemplary embodiments are equally applicable to non-mobile terminals, i.e., landline computing systems.

The disclosed exemplary embodiments provide a gas turbine, computer system and a method for controlling the gas turbine based on a novel paradigm and threshold. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other example are intended to be within the scope of the claims if they have structural elements that do not differ from the literal language of the claims, or if they include equivalent structural elements within the literal languages of the claims.

What is claimed is:

1. A method for controlling an operating point of a gas turbine that includes a compressor, a combustor and at least a turbine, the method comprising:
   determining an exhaust pressure drop at an exhaust of the turbine;
   measuring a compressor pressure discharge at the compressor;
   determining a turbine pressure ratio based on the exhaust pressure drop and the compressor pressure discharge;
   calculating an exhaust temperature reference curve of the turbine as a function of the turbine pressure ratio;
   determining whether both conditions (1) and (2) are true, wherein condition (1) is $IGV_{min} + \Delta IGV_1 \leq IGV_{set\ point} \leq IGV_{max} + \Delta IGV_2$, and condition (2) is $ttx \geq ttxh + \Delta ttx_3$, with $IGV_{set\ point}$ being a target angle of inlet guide vanes (IGV) to be provided at an inlet of the compressor, $IGV_{min}$ is a minimum value for the IGV, $IGV_{max}$ is a maximum value for the IGV, $\Delta IGV_1$ is a first predetermined positive IGV angle increase for lean-lean to premixed transfer, $\Delta IGV_2$ is a second predetermined negative IGV angle increase for lean-lean to premixed transfer, ttx is a current exhaust temperature, ttxh is the exhaust temperature reference curve, and $\Delta ttx_3$ is a predetermined negative temperature characterizing an exhaust temperature dead band for lean-lean to premixed transfer; and
   changing, if both conditions (1) and (2) are true, a split fuel quantity from a first value to a second value or otherwise maintaining the first value, the first value characterizing a lean-lean steady state mode and the second value characterizing a premixed secondary mode of a premixed mode,
   wherein the premixed mode is defined as providing fuel to primary burners and to a second burner of the combustor and igniting the provided fuel in a secondary region of the combustor while primary regions are free of flames, the primary regions being adjacent to the secondary region,
   the lean-lean mode is defined as providing fuel to both the primary burners and the secondary burner and igniting the provided fuel both in the primary regions and the secondary region, and
   the split fuel quantity describes in percentages a first amount of the total fuel that is received by the primary burners and a second amount of the total fuel that is received by the secondary burner.

2. The method of claim 1, further comprising:
   determining whether at least one of conditions (3), (4), (5) and (6) is true for at least a predetermined amount of time, wherein condition (3) is $IGV_{set\ point} \leq IGV_{min}$, condition (4) is $ttx \leq ttxh + \Delta ttx_3 + \Delta ttx_4$, condition (5) is "primary reignition"=TRUE, and condition (6) is "premixed_mode_enable"=FALSE, $\Delta ttx_4$ is a predetermined negative temperature characterizing an exhaust temperature dead band for premixed to lean-lean transfer, primary_reignition is a logical variable indicating whether the fuel in the primary region in the turbine is reignited, and premixed_mode_enable is a logical variable input by an operator; and
   changing, if one of conditions (3), (4), (5) and (6) is true, the split fuel quantity from a third value to the first value or otherwise maintaining the value, wherein the value characterizes a premixed steady state mode of the premixed mode.

3. The method of claim 1, further comprising:
   changing the second value of the fuel split quantity to a fourth value either when no flame is detected in the primary regions or after a first predetermined amount of time, wherein the fourth value characterizes a premixed transient mode of the premixed mode.

4. The method of claim 3, further comprising:
   changing the fourth value of the fuel split quantity to the third value after a second predetermined amount of time.

5. The method of claim 4, wherein the second value is the lowest, the fourth value is the highest, the third value is between the second value and the fourth value, and the first value is between the second value and the third value.

6. The method of claim 4, further comprising:
   changing the split fuel quantity between modes with a predetermined slope.

7. The method of claim 1, wherein calculating the exhaust temperature reference curve comprises:
   using a parameter indicative of a characteristic of the fuel to determine the exhaust temperature reference curve, wherein the parameter is one of a lower heating value of the fuel, NOx factor of the fuel, upper to lower flammability ratio of the fuel, or a combination thereof.

8. A controller for controlling an operating point of a gas turbine that includes a compressor, a combustor and at least a turbine, the controller comprising:
   a pressure sensor configured to measure a compressor pressure discharge at the compressor; and
   a processor connected to the pressure sensor and configured to,
   determine an exhaust pressure drop at an exhaust of the turbine,
   determine a turbine pressure ratio based on the exhaust pressure drop and the compressor pressure discharge,
   calculate an exhaust temperature reference curve of the turbine as a function of the turbine pressure ratio,
   determine whether both conditions (1) and (2) are true, wherein condition (1) is $IGV_{min} + \Delta IGV_1 \leq IGV_{set\ point} \leq IGV_{max} + \Delta IGV_2$, and condition (2) is $ttx \geq ttxh + \Delta ttx_3$, with $IGV_{set\ point}$ being a target angle of inlet guide vanes (IGV) to be provided at an inlet of the compressor, $IGV_{min}$ is a minimum value for the IGV, $IGV_{max}$ is a maximum value for the IGV, $\Delta IGV_1$ is a first predetermined IGV angle increase for lean-lean to premixed transfer, $\Delta IGV_2$ is a second predetermined positive IGV angle increase for lean-lean to premixed transfer, ttx is a current exhaust temperature, ttxh is the exhaust temperature reference curve, and $\Delta ttx_3$ is a predetermined negative temperature characterizing an exhaust temperature dead band for lean-lean to premixed transfer, and
   change, if both conditions (1) and (2) are true, a split fuel quantity from a first value to a second value or otherwise maintaining the first value, the first value characterizing a lean-lean steady state mode and the second value characterizing a premixed secondary mode of a premixed mode,
   wherein the premixed mode is defined as providing fuel to primary burners and to a second burner of the combustor and igniting the provided fuel in a secondary region of the combustor while primary regions are free of flames, the primary regions being adjacent to the secondary region, the lean-lean mode is defined as providing fuel to both the primary burners and the secondary burner and igniting the provided fuel both in the primary regions and the secondary region, and the split fuel quantity describes in percentages a first amount of the total fuel that is received by the primary burners and a second amount of the total fuel that is received by the secondary burner.

9. The controller of claim 8, wherein the processor is further configured to:

determine whether at least one of conditions (3), (4), (5) and (6) is true for at least a predetermined amount of time, wherein condition (3) is $IGV_{set\,point} \leq IGV_{min}$, condition (4) is $ttx \leq ttxh + \Delta ttx_3 + \Delta ttx_4$, condition (5) is "primary reignition"=TRUE, and condition (6) is "premixed_mode_enable"=FALSE, $\Delta ttx_4$ is a predetermined negative temperature characterizing an exhaust temperature dead band for premixed to lean-lean transfer, primary_reignition is a logical variable indicating whether the fuel in the primary region is reignited, and premix_mode_enable is a logical variable input by an operator; and changing, if one of conditions (3), (4), (5) and (6) is true, the split fuel quantity from a third value to the first value or otherwise maintaining the third value, wherein the third value characterizes a premixed steady state mode.

10. The controller of claim 8, wherein the processor is further configured to:

change the second value of the fuel split quantity to a fourth value when no flame is detected in the primary regions for a certain time or change the fuel split to the first value if the flame is detected in the primary regions after a first predetermined amount of time, wherein the fourth value characterizes a premixed transient mode.

11. The controller of claim 10, wherein the processor is further configured to:

change the fourth value of the fuel split quantity to the third value after a second predetermined amount of time.

12. The controller of claim 8, wherein the processor is further configured to:

use a parameter indicative of a characteristic of the fuel to determine the exhaust temperature reference curve, wherein the parameter is one of a lower heating value of the fuel, a NOx factor of the fuel, an upper to lower flammability ratio of the fuel, or a combination thereof.

13. The controller of claim 8, wherein the processor is further configured to:

calculate exhaust temperature reference curves based on a corresponding parameter; and select one of the calculated exhaust temperature reference curves and control the gas turbine based on the selected exhaust temperature reference curve.

* * * * *